(12) United States Patent
Renken et al.

(10) Patent No.: US 12,385,272 B2
(45) Date of Patent: Aug. 12, 2025

(54) MOBILE NOZZLES AND ASSOCIATED SYSTEMS FOR CLEANING POOLS AND SPAS

(71) Applicant: Hayward Industries, Inc., Charlotte, NC (US)

(72) Inventors: Troy Renken, Mooresville, NC (US); Dominic Conn, Tempe, AZ (US)

(*) Notice: Subject to any disclaimer, the term of this patent is extended or adjusted under 35 U.S.C. 154(b) by 0 days.

(21) Appl. No.: 17/575,106

(22) Filed: Jan. 13, 2022

(65) Prior Publication Data

US 2022/0220762 A1    Jul. 14, 2022

Related U.S. Application Data

(60) Provisional application No. 63/136,913, filed on Jan. 13, 2021.

(51) Int. Cl.
| | | |
|---|---|---|
| *E04H 4/16* | (2006.01) | |
| *B25J 11/00* | (2006.01) | |

(52) U.S. Cl.
CPC ........ *E04H 4/1654* (2013.01); *B25J 11/0085* (2013.01)

(58) Field of Classification Search
CPC ..... E04H 4/1654; E04H 4/169; E04H 4/1636; E04H 4/14; B25J 11/0085; B05B 15/74
USPC .......................................................... 15/1.7
See application file for complete search history.

(56) References Cited

U.S. PATENT DOCUMENTS

| | | | |
|---|---|---|---|
| 38,687 A | 5/1863 | Stetson | |
| 935,201 A | 9/1909 | Hallauer | |
| 1,323,960 A | 12/1919 | Burrill | |
| 1,476,029 A | 12/1923 | Black | |
| 1,821,579 A | 9/1931 | Rader | |
| 1,964,269 A | 6/1934 | Munz | |

(Continued)

FOREIGN PATENT DOCUMENTS

| | | |
|---|---|---|
| AU | 2016100472 A4 | 6/2016 |
| AU | 2016102102 A4 | 2/2017 |
| AU | 2016102214 A4 | 2/2017 |

OTHER PUBLICATIONS

PCT International Search Report and Written Opinion issued May 16, 2022, in connection with International Application No. PCT/US2022/012291 (14 pages).

(Continued)

*Primary Examiner* — Shay Karls
(74) *Attorney, Agent, or Firm* — McCarter & English, LLP

(57) ABSTRACT

Mobile nozzles and associated systems for cleaning pools and spas are provided. One or more mobile nozzles traverse a pool or spa, dislodge settled debris from the floors thereof, and direct the debris to one or more outlets for removal and/or filtration. Each of the mobile nozzles can include a body, a water intake, a discharge nozzle configured to expel pressurized water, one or more sensors adapted for navigation and/or to locate debris within the pool or spa, a propulsion system, and a control system including a memory and a processor. The discharge nozzle can be movable between a plurality of orientations relative to the body, or can have a fixed orientation. The processor is operable to identify debris in the pool or spa and cause the discharge nozzle to be positioned such that the pressurized water expelled therethrough directs the debris toward a debris collection zone or outlet.

65 Claims, 17 Drawing Sheets

(56) References Cited

U.S. PATENT DOCUMENTS

| | | |
|---|---|---|
| 2,013,188 A | 9/1935 | Reinhardt |
| 2,209,961 A | 8/1940 | Lacy-Mulhall |
| 2,214,852 A | 9/1940 | De Lacy-Mulhall |
| 2,439,282 A | 4/1948 | Beckett |
| 2,537,904 A | 1/1951 | McAllister |
| 2,545,745 A | 3/1951 | Newton |
| 2,900,079 A | 8/1959 | Pace |
| 2,940,467 A | 6/1960 | Smith |
| 3,045,829 A | 7/1962 | Rule et al. |
| 3,059,243 A | 10/1962 | Ross et al. |
| 3,067,879 A | 12/1962 | Baker |
| 3,149,784 A | 9/1964 | Skidgel |
| 3,237,866 A | 3/1966 | Lovell |
| 3,245,420 A | 4/1966 | Chemey |
| 3,247,968 A | 4/1966 | Miller |
| 3,247,969 A | 4/1966 | Miller |
| 3,291,145 A | 12/1966 | Arneson |
| 3,315,692 A | 4/1967 | Arneson |
| 3,372,948 A | 3/1968 | Arneson |
| 3,408,006 A | 10/1968 | Stanwood |
| 3,449,772 A | 6/1969 | Werner |
| 3,486,623 A | 12/1969 | Bosico |
| 3,506,489 A | 4/1970 | Baker |
| 3,515,351 A | 6/1970 | Costa |
| 3,521,304 A | 7/1970 | Ghiz |
| 3,567,127 A | 3/1971 | Raumaker et al. |
| 3,615,013 A | 10/1971 | Reece |
| 3,616,916 A | 11/1971 | Greene |
| 3,675,252 A | 7/1972 | Ghiz |
| 3,688,907 A | 9/1972 | Oravec |
| 3,712,470 A | 1/1973 | Gansloser |
| 3,713,584 A | 1/1973 | Hunter |
| 3,749,424 A | 7/1973 | Greene |
| 3,765,608 A | 10/1973 | Lockwood |
| 3,769,993 A | 11/1973 | Schaeffer |
| 3,770,203 A | 11/1973 | Dyar |
| 3,806,031 A | 4/1974 | Olson |
| 3,877,482 A | 4/1975 | Rawdon |
| 3,895,645 A | 7/1975 | Johnson |
| 3,955,764 A | 5/1976 | Phaup |
| 4,114,204 A | 9/1978 | Blach |
| 4,114,206 A | 9/1978 | Franc |
| 4,116,216 A | 9/1978 | Rosenberg |
| 4,185,333 A | 1/1980 | Ortega |
| 4,188,673 A | 2/1980 | Carter |
| 4,193,870 A | 3/1980 | Goodin |
| 4,195,371 A | 4/1980 | Goodin |
| 4,200,230 A | 4/1980 | Gould |
| 4,202,499 A | 5/1980 | Mathews |
| 4,212,088 A | 7/1980 | Goettl et al. |
| 4,230,142 A | 10/1980 | Saarem et al. |
| 4,271,541 A | 6/1981 | Mathews |
| 4,276,163 A | 6/1981 | Gordon |
| 4,322,860 A | 4/1982 | Gould |
| 4,330,412 A | 5/1982 | Frederick |
| 4,342,125 A | 8/1982 | Hodge |
| 4,347,979 A | 9/1982 | Mathews |
| 4,371,994 A | 2/1983 | Mathews |
| 4,373,220 A | 2/1983 | Selsted |
| 4,391,005 A | 7/1983 | Goettl |
| 4,431,024 A | 2/1984 | Gallagher |
| 4,462,546 A | 7/1984 | Pitman |
| 4,466,142 A | 8/1984 | Gould |
| 4,471,908 A | 9/1984 | Hunter |
| 4,486,907 A | 12/1984 | Carter |
| 4,503,573 A | 3/1985 | Handzel |
| 4,520,514 A | 6/1985 | Johnson |
| 4,535,937 A | 8/1985 | Fagan et al. |
| 4,561,134 A | 12/1985 | Mathews et al. |
| 4,568,024 A | 2/1986 | Hunter |
| 4,592,379 A | 6/1986 | Goettl |
| 4,600,031 A | 7/1986 | Nestich |
| 4,640,784 A | 2/1987 | Cant |
| 4,681,259 A | 7/1987 | Troup et al. |
| 4,783,004 A | 11/1988 | Lockwood |
| 4,792,095 A | 12/1988 | Pristo et al. |
| 4,832,838 A | 5/1989 | Stone |
| 4,879,772 A | 11/1989 | Meloney, Jr. |
| 4,907,610 A | 3/1990 | Meincke |
| 4,919,337 A | 4/1990 | Van Leeuwen et al. |
| 4,919,338 A | 4/1990 | Junk |
| 4,939,797 A | 7/1990 | Goettl |
| 5,048,758 A | 9/1991 | Jackerson |
| 5,107,872 A | 4/1992 | Meincke |
| 5,135,579 A | 8/1992 | Goettl |
| 5,195,191 A | 3/1993 | Stefan et al. |
| 5,251,343 A | 10/1993 | Goettl |
| 5,265,631 A | 11/1993 | Goettl |
| 5,333,788 A | 8/1994 | Hadar |
| 5,408,706 A | 4/1995 | Barnes |
| 5,826,797 A | 10/1998 | Kah, III |
| 5,830,350 A | 11/1998 | Voss et al. |
| 5,845,849 A | 12/1998 | Mitzlaff |
| 5,901,906 A | 5/1999 | Bouldin |
| 5,975,430 A | 11/1999 | Larsen |
| 5,992,760 A | 11/1999 | Kearby et al. |
| 6,022,481 A | 2/2000 | Blake |
| 6,029,907 A | 2/2000 | McKenzie |
| 6,085,995 A | 7/2000 | Kah, Jr. et al. |
| 6,182,909 B1 | 2/2001 | Kah, Jr. et al. |
| 6,237,862 B1 | 5/2001 | Kah, III et al. |
| 6,301,723 B1 | 10/2001 | Goettl |
| 6,367,098 B1 | 4/2002 | Barnes |
| 6,393,629 B1 | 5/2002 | Barnes et al. |
| 6,419,840 B1 | 7/2002 | Meincke |
| 6,438,766 B1 | 8/2002 | Capdevila Arnau et al. |
| 6,488,218 B1 | 12/2002 | Townsend et al. |
| 6,601,244 B1 | 8/2003 | Goettl |
| 6,622,933 B1 | 9/2003 | Young et al. |
| 6,848,124 B2 | 2/2005 | Goettl |
| 6,899,285 B2 | 5/2005 | Goettl et al. |
| 6,971,588 B1 | 12/2005 | Tarr et al. |
| 7,168,634 B2 | 1/2007 | Onofrio |
| 7,300,576 B1 | 11/2007 | Blake |
| 7,481,377 B2 | 1/2009 | Goettl et al. |
| 7,563,365 B2 | 7/2009 | Pellington et al. |
| 7,578,010 B2 | 8/2009 | Goettl |
| 7,708,212 B1 | 5/2010 | Conn |
| 7,819,338 B1 | 10/2010 | Goettl |
| 7,958,615 B1 | 6/2011 | Conn |
| 7,979,924 B1 | 7/2011 | Goettl |
| 8,056,155 B1 | 11/2011 | Goettl |
| 8,266,737 B1 | 9/2012 | Goettl |
| 8,308,081 B1 | 11/2012 | Goettl |
| 8,499,372 B1 | 8/2013 | Conn |
| 8,533,874 B1 | 9/2013 | Goettl |
| 8,661,595 B2 | 3/2014 | Bernini |
| 8,959,739 B1 | 2/2015 | Goettl et al. |
| 9,267,303 B1 | 2/2016 | Goettl |
| 9,777,498 B1 | 10/2017 | Farrier et al. |
| 9,828,783 B1 | 11/2017 | Farrier et al. |
| 10,161,151 B2 | 12/2018 | Goettl et al. |
| 10,233,661 B2 | 3/2019 | Goettl |
| 10,604,955 B1 | 3/2020 | Goettl et al. |
| 2004/0194201 A1 | 10/2004 | Goettl |
| 2004/0217210 A1 | 11/2004 | Goettl et al. |
| 2005/0023373 A1 | 2/2005 | Goettl |
| 2005/0167520 A1 | 8/2005 | Goettl et al. |
| 2008/0148500 A1 | 6/2008 | Ribeiro |
| 2009/0159516 A1 | 6/2009 | Andrei |
| 2012/0174312 A1 | 7/2012 | Loyd et al. |
| 2013/0007954 A1 | 1/2013 | Sutton et al. |
| 2014/0115796 A1 | 5/2014 | Sebor et al. |
| 2015/0300034 A1* | 10/2015 | Erlich .............. B08B 9/08 15/1.7 |
| 2016/0040445 A1 | 2/2016 | Borg et al. |
| 2018/0066444 A1 | 3/2018 | van der Meijden et al. |

(56) References Cited

U.S. PATENT DOCUMENTS

2018/0135325 A1\* 5/2018 Schloss ................ E04H 4/1654
2020/0056391 A1\* 2/2020 Lancry .................. B01D 29/27

OTHER PUBLICATIONS

CSI, Leaf Trapper Main Drain System Installation Bulletin, no publication year listed, 8 pgs.
Arneson Pool Sweep(R) Automatic Pool Cleaners Numbers I & II dated Dec. 1986 (12 pages).
PCT Invitation to Pay Additional Fees dated Mar. 21, 2022, in connection with International Application No. PCT/US2022/012291 (2 pages).

\* cited by examiner

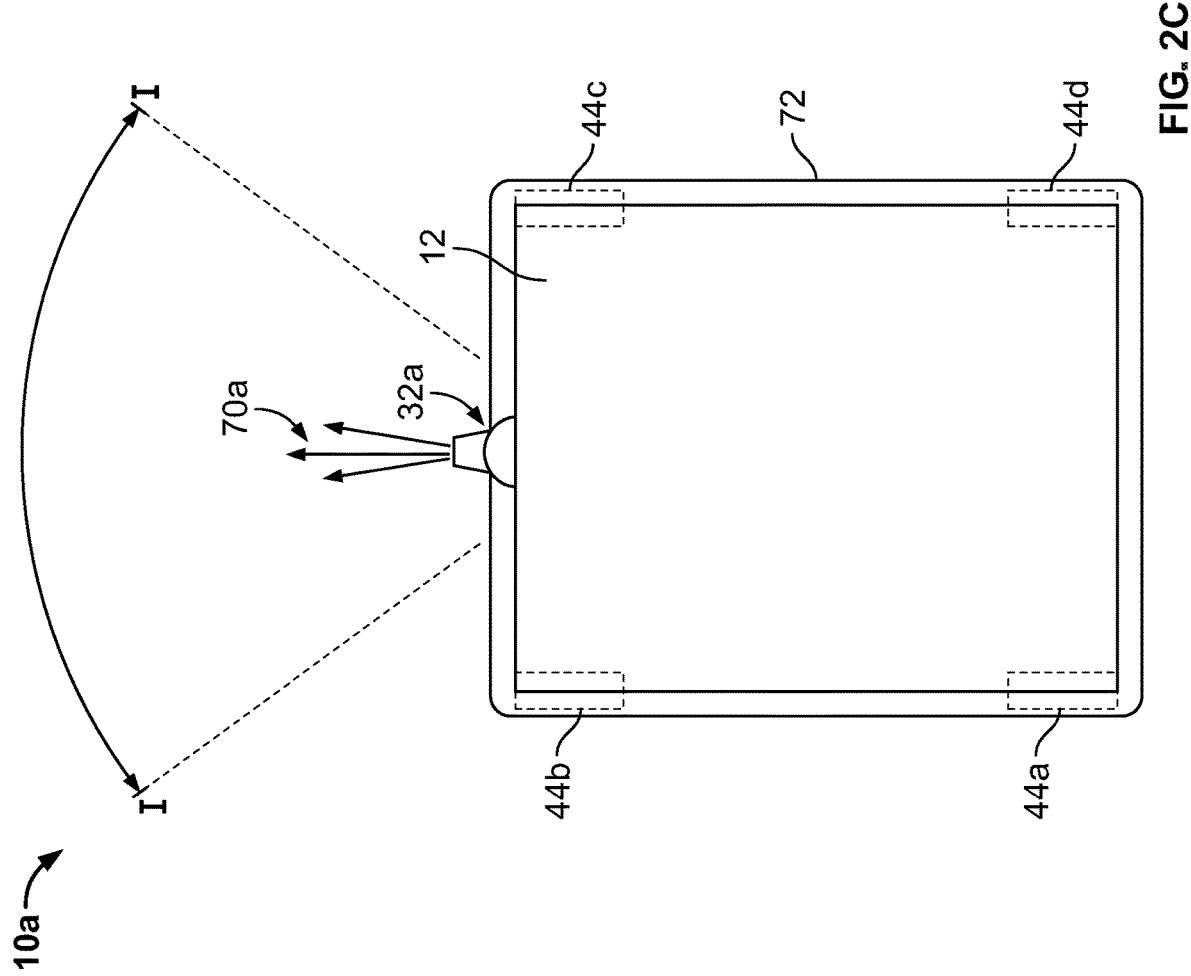

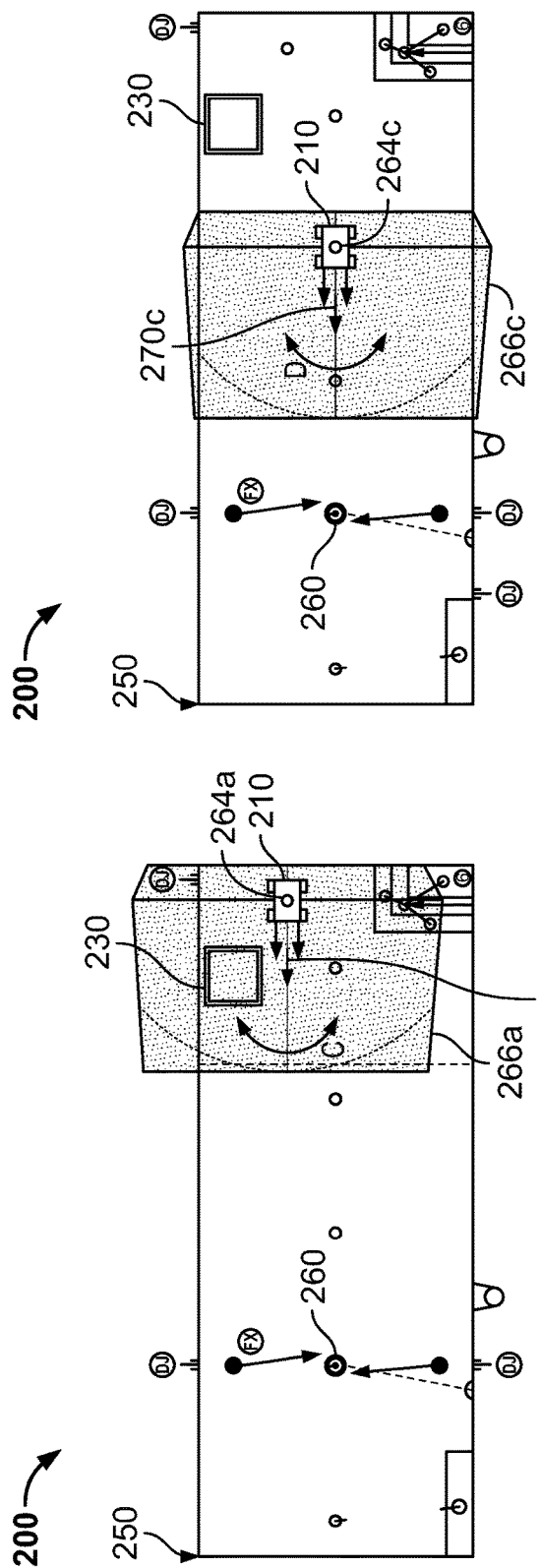
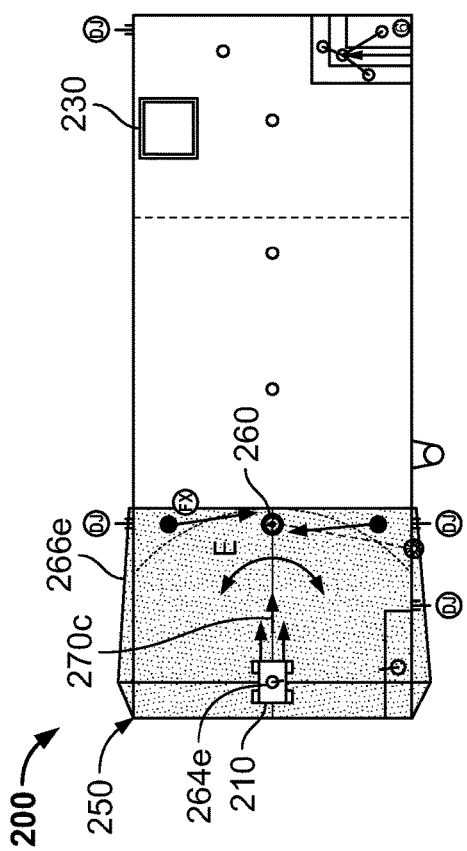

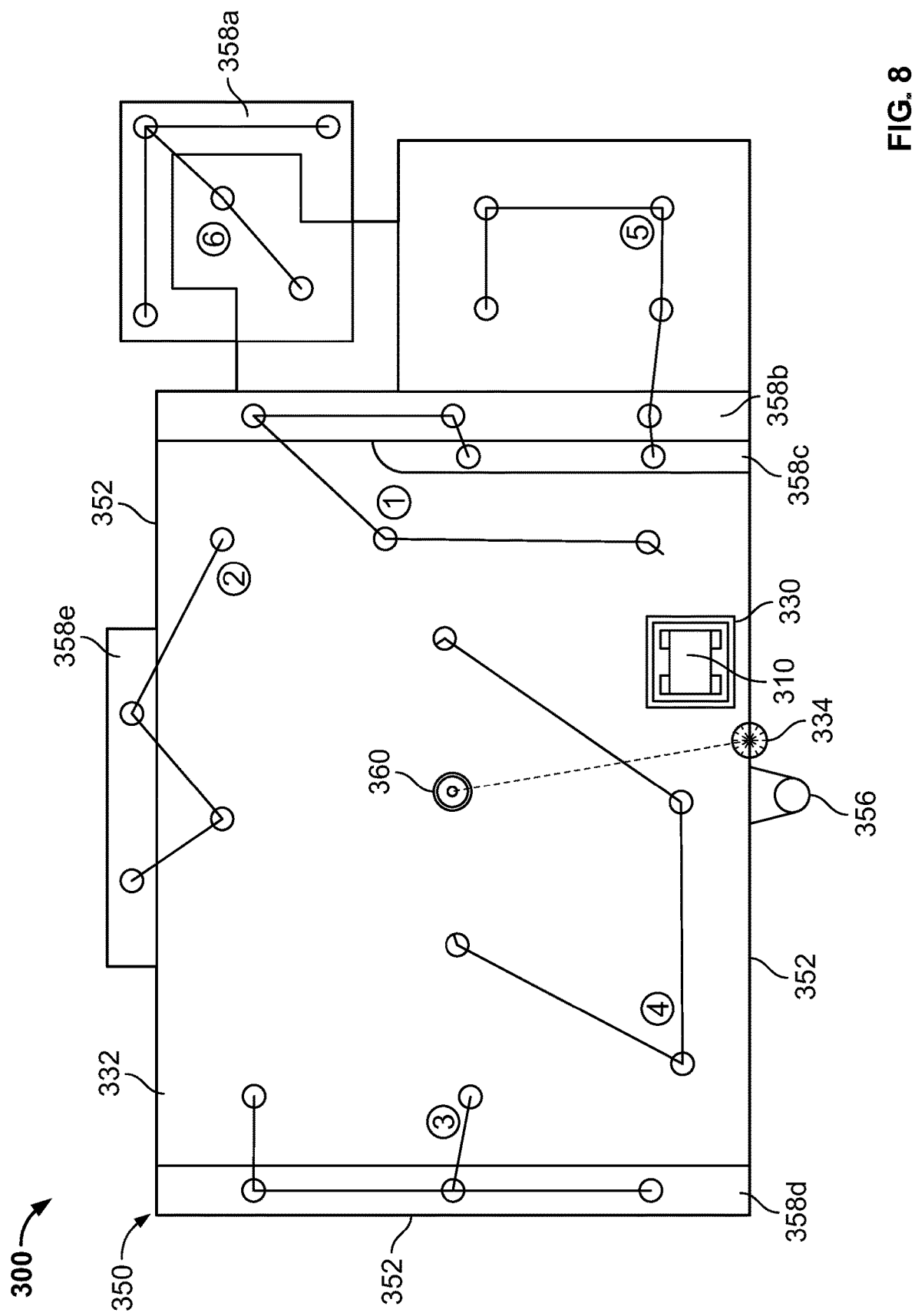

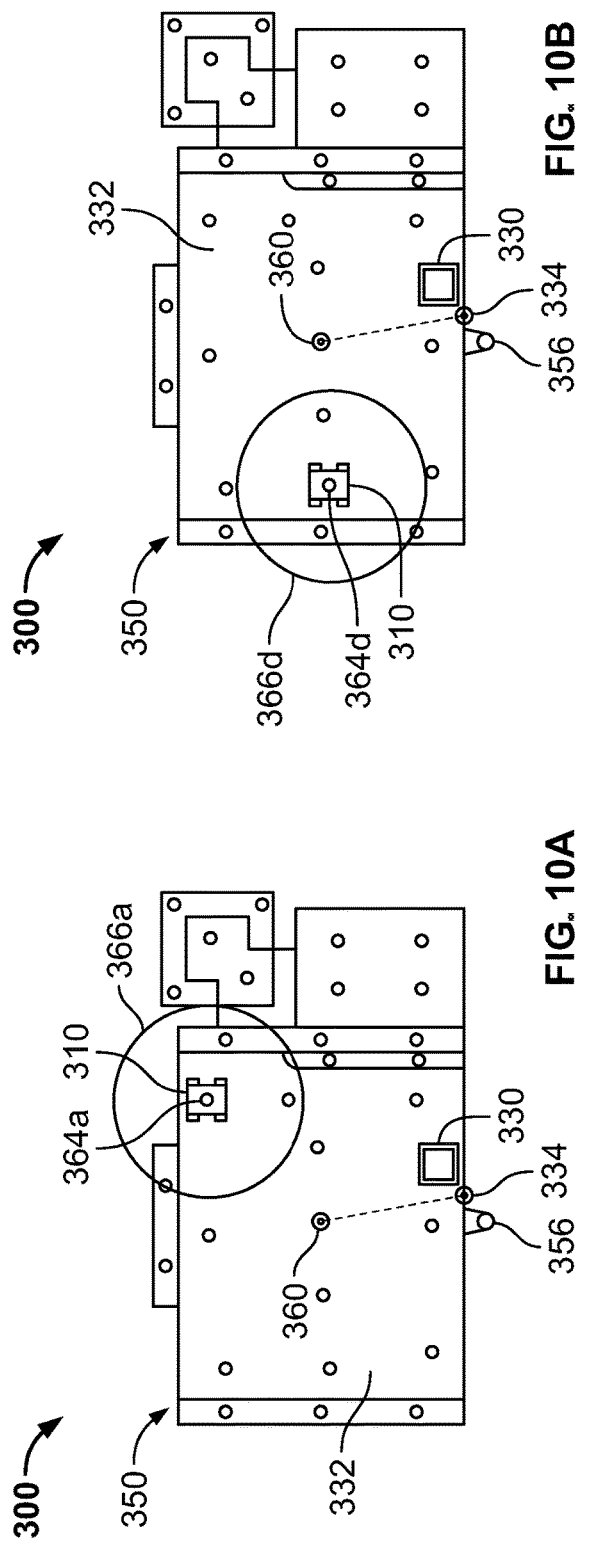
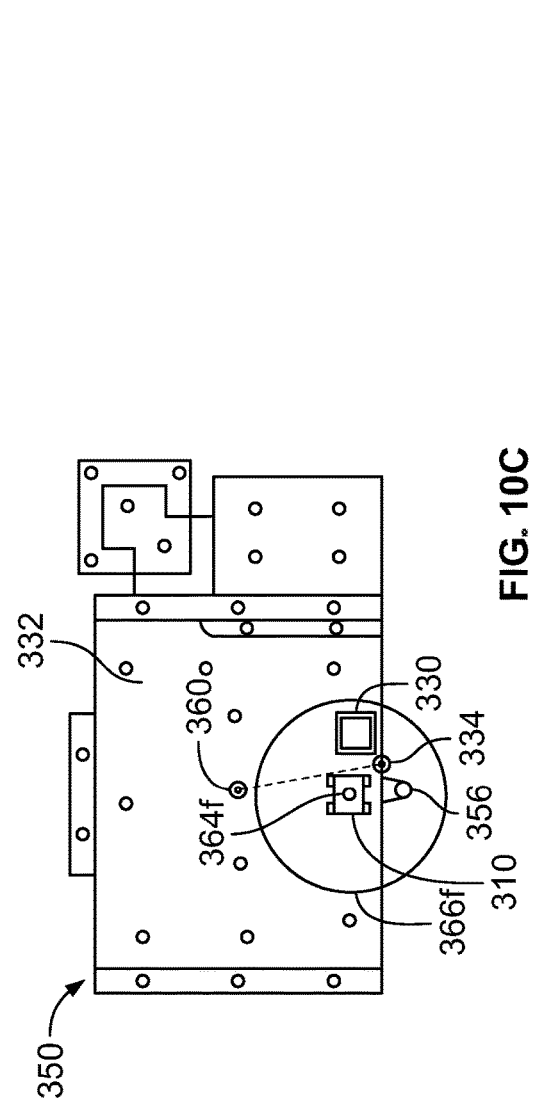

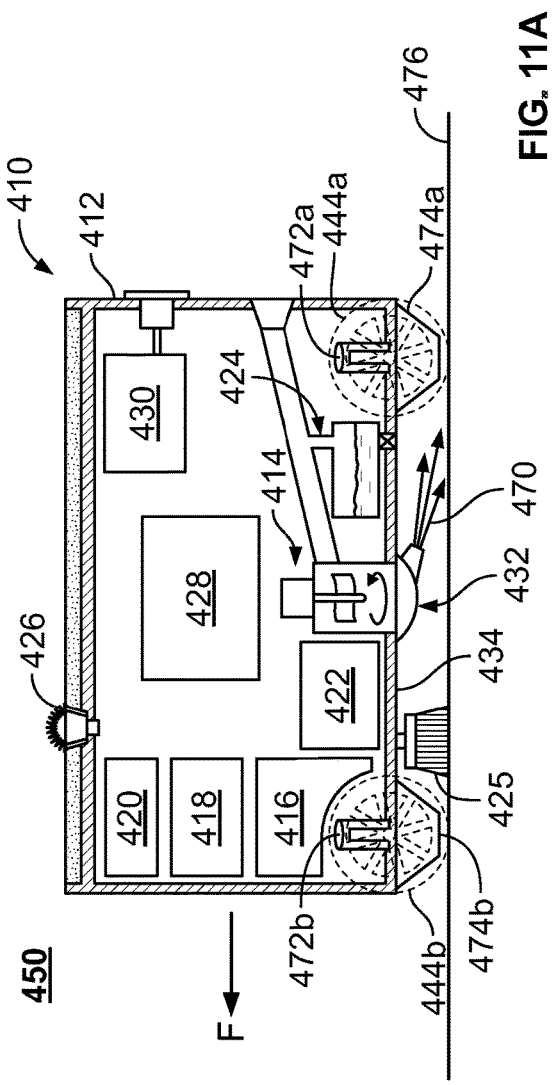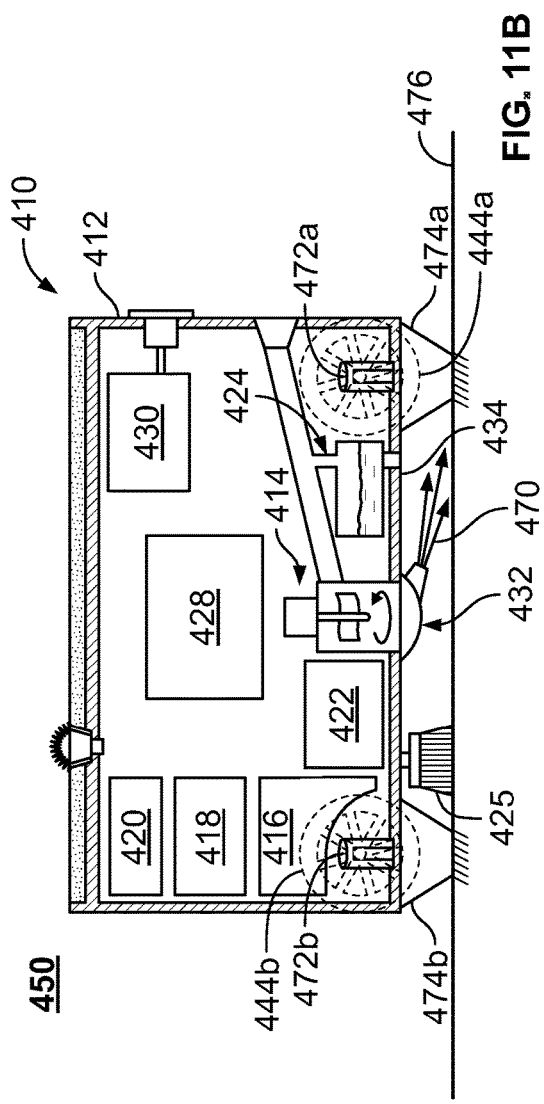

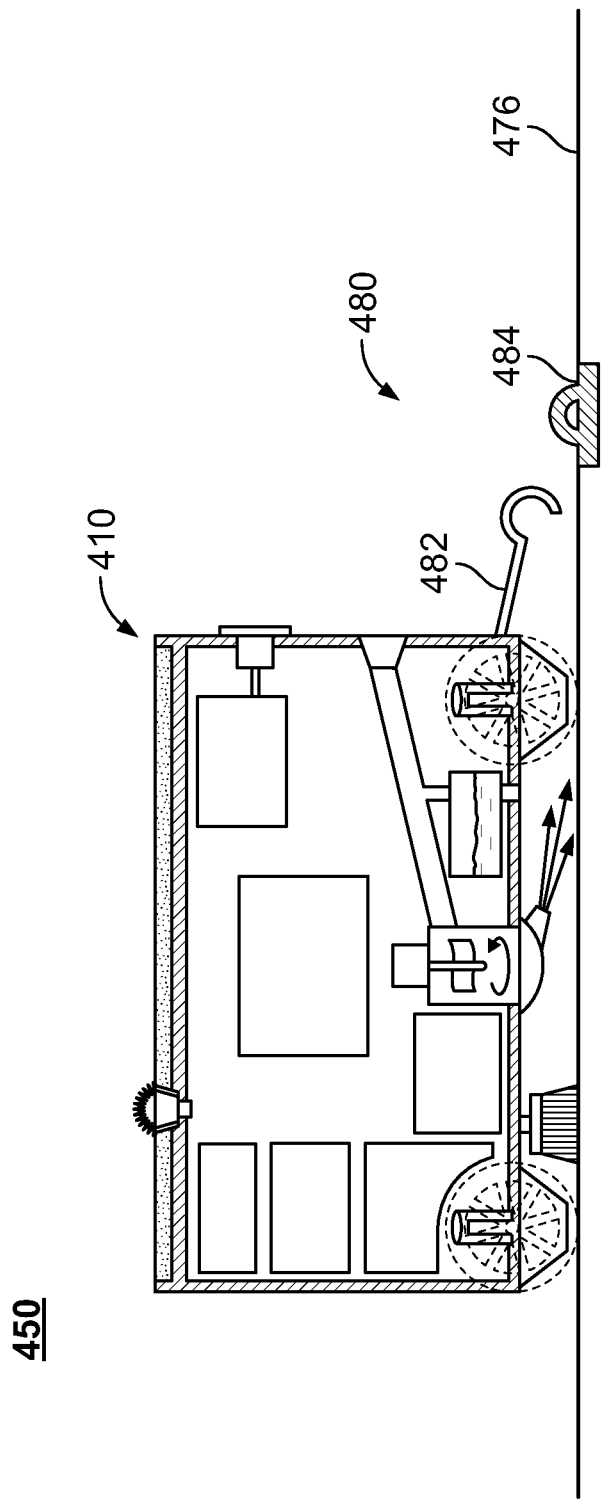

MOBILE NOZZLES AND ASSOCIATED SYSTEMS FOR CLEANING POOLS AND SPAS

RELATED APPLICATIONS

The present application claims the benefit of priority to U.S. Provisional Patent Application No. 63/136,913, filed on Jan. 13, 2021, the entire disclosure of which is expressly incorporated by reference herein.

BACKGROUND

Technical Field

The present disclosure relates generally to the field of nozzle cleaning systems for pools and spas. More specifically, the present disclosure relates to mobile nozzles and associated systems for cleaning for pools and spas that dislodge debris from the floors and walls thereof, and direct the dislodged debris to one or more outlets for removal and/or filtration.

Related Art

Swimming pools commonly require a considerable amount of maintenance. Beyond the treatment and filtration of pool water, the bottom wall (the "floor") and side walls of a pool (the floor and the side walls are referred herein collectively as the "walls" of the pool) must be scrubbed or otherwise cleaned regularly. Additionally, leaves and other debris often elude a pool filtration system and settle on the bottom of the pool.

Various devices and systems have been developed to clean swimming pool walls and swimming pool water, e.g., by dislodging and removing dirt and debris from the walls. For example, in-floor nozzle systems have been developed that utilize a series of pipes and nozzles, e.g., pop-up nozzles, that discharge a stream of water to dislodge dirt and debris from pool walls and direct the dirt and debris to a drain. In particular, such systems include multiple pipes and nozzles that are installed in the floor and/or walls of the pool and connected with a pressurized source of water, e.g., a pool pump. The pool pump provides pressurized water to the pipes and, in turn, the nozzles, which discharge the pressurized water across a surface of the pool to dislodge, entrain, and move contaminants, e.g., dirt and debris, from the walls toward a drain that is installed in the floor. The contaminants are then removed from the pool through the drain. However, these systems require pipes and nozzles to be installed either below or within the walls, and cleaning zones/nozzle placement to be developed for each pool to ensure that the entire area of the pool is covered. The materials and labor required to install the piping and nozzles can be costly, and if incorrectly installed, e.g., if the nozzles are incorrectly placed and do not adequately clean the pool walls, can be difficult and expensive to correct.

Additionally, various types of automated pool cleaning devices, e.g., swimming pool cleaners, have been developed that traverse the pool walls and skim the pool water surface, cleaning as they go. These pool cleaners are generally categorized by their source of power and include positive pressure pool cleaners, suction (negative pressure) pool cleaners, and robotic/electric pool cleaners.

Positive pressure pool cleaners are in fluidic communication with a source of pressurized water. This source of pressurized water could include, for example, a booster pump or pool filtration system. Generally, this requires a hose running from the pump or system to the swimming pool cleaner through which pressurized water is provided to the pool cleaner. Some positive pressure pool cleaners discharge the pressurized water through one or more internal nozzles to create a suction effect at a bottom opening of the swimming pool cleaner, drawing debris through the bottom opening and into a retention device, e.g., a debris bag, of the swimming pool cleaner. Additionally, some positive pressure pool cleaners discharge a portion of the pressurized water externally through one or more nozzles to cause locomotion of the pool cleaner.

On the other hand, suction pool cleaners are in fluidic communication with a suction source that draws water from the pool through the suction pool cleaner. This is often achieved through a suction hose that is connected between the suction pool cleaner and the suction source, which can be a wall fitting in communication with the suction side of a pool pump. This suction effect causes water and debris to be drawn through the suction pool cleaner and in turn the suction hose to a filter basket where the debris is collected. Additionally, suction pool cleaners can utilize the water being drawn therethrough to cause the pool cleaner to move across the pool walls.

Finally, many robotic/electric pool cleaners utilize electric power provided through an electrical cable or wire from an external power source to move and operate. In particular, the electrical power received by the pool cleaner is often used to power various internal motors and pumps. The motors can be utilized to turn wheels or circulate continuous tracks in order move the pool cleaner along the pool walls. Additionally, the motors and/or pumps can be used to generate a suction effect at a bottom opening of the pool cleaner to draw debris into a container within or on the pool cleaner.

However, the hoses and wires implemented with positive pressure, suction, and robotic/electric pool cleaners are visibly distracting and a nuisance to swimmers. Additionally, these swimming pool cleaners must often be removed from the pool between cleanings. Accordingly, there is a need for improvements in pool cleaning devices and systems that are capable of cleaning pool walls without requiring high installation costs and without having the nuisance of hoses or wires.

SUMMARY

The present disclosure relates to mobile nozzles and associated systems for cleaning pools and spas that dislodge settled debris from pool and spa floors and direct the debris to one or more outlets for removal and/or filtration.

According to one embodiment of the present disclosure, a mobile nozzle for expelling pressurized water toward a debris collection zone displaced from the mobile nozzle is provided. The mobile nozzle includes a body, a water intake configured to receive water, a discharge nozzle in fluidic communication with the water intake and configured to expel pressurized water, and a computer system including a memory and a processor. The processor is operable identify the debris collection zone, cause the mobile nozzle to move to a first location in a pool or spa, and cause the pressurized water to be expelled through the discharge nozzle toward the debris collection zone to cause debris to move away from the mobile nozzle and toward the debris collection zone when the mobile nozzle is positioned at the first location.

According to certain aspects of the present disclosure, the processor causes the mobile nozzle to move to a second location in the pool or spa and causes the pressurized water to be expelled through the discharge nozzle toward the debris collection zone to cause debris to move away from the mobile nozzle and toward the debris collection zone, when the mobile nozzle is positioned at the second location. According to further aspects, the processor is operable to communicate with a first beacon positioned at the first location, locate a position of the first beacon based on the communication with the first beacon, communicate with a second beacon positioned at the second location, and locate a position of the second beacon based on the communication with the second beacon. According to other aspects, the processor is operable to communicate with a beacon positioned at the debris collection zone, and locate the debris collection zone based on the communication with the beacon.

According to other aspects of the present disclosure, the discharge nozzle is positioned on a front of the body and is configured to expel the pressurized water in a generally forward and downward direction. In some aspects, the discharge nozzle can be adjustable and can be rotatable in a sweeping motion. In other aspects, the mobile nozzle is configured to rotate about a pivot point to cause the discharge nozzle to move in a sweeping motion. The mobile nozzle can also include a second discharge nozzle in fluidic communication with the water intake, the second discharge nozzle being configured to expel the pressurized water and cause locomotion of the mobile nozzle.

According to certain aspects of the present disclosure, the mobile nozzle includes a lift nozzle positioned at a bottom of the body that is configured to expel the pressurized water away from the bottom of the body. The mobile nozzle can also include a bottom skirt that extends about a perimeter of the body and defines a pressure chamber, the bottom skirt being configured to contain the pressurized water expelled by the lift nozzle within the pressure chamber to cause the mobile nozzle to lift. In some aspects, the mobile nozzle includes a plurality of wheels and in further aspects, the plurality of wheels are retractable.

According to other aspects of the present disclosure, the mobile nozzle includes a rechargeable battery and a first inductive power coupling, which includes an inductor circuit and is configured to inductively receive power from a second inductive power coupling and recharge the rechargeable battery when positioned proximate to the second inductive power coupling. The second inductive power coupling can include a charging housing.

According to aspects of the present disclosure, the mobile nozzle is configured to be housed within a niche located in one or more of a wall and a floor of the pool or spa and the mobile nizzle further includes a rechargeable battery configured to receive power from a power source of the niche.

According to other aspects of the present disclosure, the mobile nozzle includes a means for preventing motion of the mobile nozzle when expelling pressurized water through the discharge nozzle.

According to some aspects of the present disclosure, the mobile nozzle includes a pump in fluidic communication with the water intake and the discharge nozzle, which is configured to draw water in through the water intake and expel the water out from the discharge nozzle. In further aspects, the pump can be reversible and configured to draw water in through the discharge nozzle and expel the water out from the water intake.

According to aspects of the present disclosure, the processor of the mobile nozzle is operable to automatically determine an optimal position for the first location in the pool or spa. In some aspects, the processor is operable to identify the location of the debris collection zone based on user input. In other aspects, the processor is operable to receive a user defined map of the pool or spa, the user defined map including a position of the debris collection zone and a position of the first location. In further aspects, the processor is configured to receive an indication that a pump in fluidic communication with the debris collection zone is operational and causes pressurized water to be expelled through the discharge nozzle based on the indication.

According to other aspects of the present disclosure, the mobile nozzle includes a second discharge nozzle in fluidic communication with the water intake and the discharge nozzle and a valve in fluidic communication with the discharge nozzle, the second discharge nozzle, and the water intake. The valve can be configured to control the flow of water between the discharge nozzle, the second discharge nozzle, and the water intake.

According to another embodiment of the present disclosure a method of collecting debris in a debris collection zone using a mobile nozzle is provided. The method includes identifying the debris collection zone, causing the mobile nozzle to move to a first location in a pool or spa, the mobile nozzle comprising a body, a water intake configured to receive water, a discharge nozzle in fluidic communication with the water intake and configured to expel pressurized water, and a computer system including a memory and a processor, and expelling pressurized water through the discharge nozzle of the mobile nozzle toward the debris collection zone to cause debris to move away from the mobile nozzle and toward the debris collection zone when the mobile nozzle is positioned at the first location.

According to certain aspects of the present disclosure, the method includes moving to a second location in the pool or spa and expelling pressurized water through the discharge nozzle toward the debris collection zone to cause the debris to move away from the mobile nozzle and toward the debris collection zone when the mobile nozzle is positioned at the second location. In some aspects, the method includes communicating with a first beacon positioned at the first location, locating a position of the first beacon based on the communication with the first beacon, communicating with a second beacon positioned at the second location, and locating a position of the second beacon based on the communication with the second beacon. According to further aspects, the method includes communicating with a beacon positioned at the debris collection zone and locating the debris collection zone based on the communication with the beacon. In still further aspects, the step of identifying the debris collection zone is performed by the processor of the mobile nozzle.

According to other aspects of the present disclosure, the discharge nozzle is positioned on a front of the body and configured to expel pressurized water in a generally forward and downward direction. In some aspects, the discharge nozzle is adjustable. In further aspects, the method includes rotating the discharge nozzle in a sweeping motion while expelling pressurized water through the discharge nozzle. In other aspects, the method includes rotating the mobile nozzle about a pivot point to cause the discharge nozzle to move in a sweeping motion while expelling pressurized water through the discharge nozzle.

According to certain aspects of the present disclosure, the mobile nozzle includes a second discharge nozzle in fluidic communication with the water intake, and the step of causing the mobile nozzle to move to a first location in a pool or spa includes expelling pressurized water through the second discharge nozzle. In some aspects, the mobile nozzle includes a lift nozzle positioned at a bottom of the body and configured to expel pressurized water away from the bottom of the body and a bottom skirt extending about a perimeter of the body and defining a pressure chamber, the bottom skirt being configured to contain the pressurized water expelled by the lift nozzle within the pressure chamber to cause the mobile nozzle to lift. The mobile nozzle can also include a plurality of wheels and the plurality of wheels can be retractable.

According to another aspect of the present disclosure, the mobile nozzle includes a rechargeable battery and a first inductive power coupling including an inductor circuit, the first inductive power coupling being configured to inductively receive power from a second inductive power coupling and recharge the rechargeable battery when positioned proximate to the second inductive power coupling. In some aspects, the method includes moving the mobile nozzle toward the second inductive power coupling, positioning the first inductive power coupling proximate the second inductive power coupling, receiving by the first inductive power coupling power from the second inductive power coupling, and recharging the rechargeable battery with the power received by the first inductive power coupling. The second inductive power coupling can include a charging housing.

According to aspects of the present disclosure, the method includes positioning the mobile nozzle within a niche located in one or more of a wall and a floor of the pool or spa. In further aspects, the mobile nozzle receives power from a power source of the niche and the method includes recharging a rechargeable battery of the mobile nozzle with the power received by the mobile nozzle.

According to some aspects of the present disclosure, the mobile nozzle includes means for preventing motion of the mobile nozzle when expelling pressurized water through the discharge nozzle.

According to another aspect of the present disclosure, the mobile nozzle comprises a pump in fluidic communication with the water intake and the discharge nozzle, the pump being configured to draw water in through the water intake and expel the water out from the discharge nozzle. In some aspects, the pump is reversible and configured to draw water in through the discharge nozzle and expel the water out from the water intake.

According to some aspects of the present disclosure, the processor determines an optimal position for the first location in the pool or spa. In further aspects, the step of identifying the debris collection zone is performed based on user input. The method can also include receiving a user defined map of the pool or spa including a position of the debris collection zone and a position of the first location.

According to some aspects of the present disclosure, the method includes receiving an indication that a pump in fluidic communication with the debris collection zone is operational and controlling the mobile nozzle to expel the pressurized water through the discharge nozzle of the mobile nozzle, based on the indication received.

According to other aspects, the mobile nozzle includes a second discharge nozzle in fluidic communication with the water intake and the discharge nozzle and a valve in fluidic communication with the discharge nozzle, the second discharge nozzle, and water intake. The valve can be configured to control the flow of water between the discharge nozzle, the second discharge nozzle, and the water intake.

According to another embodiment of the present disclosure, mobile nozzle for agitating debris in a pool or a spa is provided. The mobile nozzle includes a body, a water intake configured to receive water, a discharge nozzle in fluidic communication with the water intake, the discharge nozzle configured to expel pressurized water, and a computer system including a memory and a processor. The processor is operable to identify a first agitation location in the pool or the spa, cause the mobile nozzle to move to the first agitation location, expel pressurized water through the discharge nozzle to agitate debris at the first agitation location, identify a second agitation location in the pool or the spa, cause the mobile nozzle to move to the second agitation location; and expel pressurized water through the discharge nozzle to agitate debris at the second agitation location. The processor can be further operable to cause the mobile nozzle to move in a navigation pattern, the navigation pattern including the first agitation location and the second agitation location. According to some aspects, the processor is further operable to communicate with a first beacon positioned at the first location, locate a position of the first beacon based on the communication with the first beacon, communicate with a second beacon positioned at the second location, and locate a position of the second beacon based on the communication with the second beacon.

According to other aspects of the present disclosure, the discharge nozzle is positioned on a front of the body and is configured to expel the pressurized water in a generally forward and downward direction. In some aspects, the discharge nozzle can be adjustable and can be rotatable in a sweeping motion. In other aspects, the mobile nozzle is configured to rotate about a pivot point to cause the discharge nozzle to move in a sweeping motion. In further aspects, the mobile nozzle is configured to rotate 360 degrees. The mobile nozzle can also include a second discharge nozzle in fluidic communication with the water intake, the second discharge nozzle being configured to expel the pressurized water and cause locomotion of the mobile nozzle.

According to certain aspects of the present disclosure, the mobile nozzle includes a lift nozzle positioned at a bottom of the body that is configured to expel the pressurized water away from the bottom of the body. The mobile nozzle can also include a bottom skirt that extends about a perimeter of the body and defines a pressure chamber, the bottom skirt being configured to contain the pressurized water expelled by the lift nozzle within the pressure chamber to cause the mobile nozzle to lift. In some aspects, the mobile nozzle includes a plurality of wheels and in further aspects, the plurality of wheels are retractable.

According to other aspects of the present disclosure, the mobile nozzle includes a rechargeable battery and a first inductive power coupling, which includes an inductor circuit and is configured to inductively receive power from a second inductive power coupling and recharge the rechargeable battery when positioned proximate to the second inductive power coupling. The second inductive power coupling can include a charging housing.

According to aspects of the present disclosure, the mobile nozzle is configured to be housed within a niche located in one or more of a wall and a floor of the pool or spa and the mobile nizzle further includes a rechargeable battery configured to receive power from a power source of the niche.

According to other aspects of the present disclosure, the mobile nozzle includes a means for preventing motion of the mobile nozzle when expelling pressurized water through the discharge nozzle.

According to some aspects of the present disclosure, the mobile nozzle includes a pump in fluidic communication with the water intake and the discharge nozzle, which is configured to draw water in through the water intake and expel the water out from the discharge nozzle. In further aspects, the pump can be reversible and configured to draw water in through the discharge nozzle and expel the water out from the water intake.

According to certain aspects of the present disclosure, the processor is operable to automatically determine an optimal position for the first agitation location and the second agitation location in the pool or spa. In other aspects, the processor is operable to receive a user defined map of the pool or spa, which can include a position of the first agitation location and a position of the second agitation location. According to further aspects, the processor is configured to receive an indication that a pump in fluidic communication with a pool or spa skimmer is operational, and causes pressurized water to be expelled through the discharge nozzle based on the indication.

According to other aspects of the present disclosure, the mobile nozzle includes a second discharge nozzle in fluidic communication with the water intake and the discharge nozzle and a valve in fluidic communication with the discharge nozzle, the second discharge nozzle, and the water intake. The valve can be configured to control the flow of water between the discharge nozzle, the second discharge nozzle, and the water intake.

According to another embodiment of the present disclosure, a method of agitating debris in a pool or spa using a mobile nozzle is provided. The method includes identifying a first agitation location in the pool or spa, causing the mobile nozzle to move to the first agitation location, the mobile nozzle comprising a body, a water intake configured to receive water, a discharge nozzle in fluidic communication with the water intake and configured to expel pressurized water, and a computer system including a memory and a processor, expelling pressurized water through the discharge nozzle of the mobile nozzle to agitate debris at the first agitation location, identifying a second agitation location in the pool or spa, causing the mobile nozzle to move to the second agitation location, and expelling pressurized water through the discharge nozzle of the mobile nozzle to agitate debris at the second agitation location.

According to certain aspects of the present disclosure, the first agitation location and the second agitation location are a portion of a navigation pattern. In some aspects, the method includes communicating with a first beacon positioned at the first agitation location, locating a position of the first beacon based on the communication with the first beacon, communicating with a second beacon positioned at the second agitation location, and locating a position of the second beacon based on the communication with the second beacon.

According to other aspects of the present disclosure, the discharge nozzle is positioned on a front of the body and configured to expel pressurized water in a generally forward and downward direction. In some aspects, the discharge nozzle is adjustable. In further aspects, the method includes rotating the discharge nozzle in a sweeping motion while expelling pressurized water through the discharge nozzle. In other aspects, the method includes rotating the mobile nozzle about a pivot point to cause the discharge nozzle to move in a sweeping motion while expelling pressurized water through the discharge nozzle. in further aspects, the mobile nozzle can be rotated 360 degrees.

According to certain aspects of the present disclosure, the mobile nozzle includes a second discharge nozzle in fluidic communication with the water intake, and the step of causing the mobile nozzle to move to a first location in a pool or spa includes expelling pressurized water through the second discharge nozzle. In some aspects, the mobile nozzle includes a lift nozzle positioned at a bottom of the body and configured to expel pressurized water away from the bottom of the body and a bottom skirt extending about a perimeter of the body and defining a pressure chamber, the bottom skirt being configured to contain the pressurized water expelled by the lift nozzle within the pressure chamber to cause the mobile nozzle to lift. The mobile nozzle can also include a plurality of wheels and the plurality of wheels can be retractable.

According to another aspect of the present disclosure, the mobile nozzle includes a rechargeable battery and a first inductive power coupling including an inductor circuit, the first inductive power coupling being configured to inductively receive power from a second inductive power coupling and recharge the rechargeable battery when positioned proximate to the second inductive power coupling. In some aspects, the method includes moving the mobile nozzle toward the second inductive power coupling, positioning the first inductive power coupling proximate the second inductive power coupling, receiving by the first inductive power coupling power from the second inductive power coupling, and recharging the rechargeable battery with the power received by the first inductive power coupling. The second inductive power coupling can include a charging housing.

According to aspects of the present disclosure, the method includes positioning the mobile nozzle within a niche located in one or more of a wall and a floor of the pool or spa. In further aspects, the mobile nozzle receives power from a power source of the niche and the method includes recharging a rechargeable battery of the mobile nozzle with the power received by the mobile nozzle.

According to some aspects of the present disclosure, the mobile nozzle includes means for preventing motion of the mobile nozzle when expelling pressurized water through the discharge nozzle.

According to another aspect of the present disclosure, the mobile nozzle comprises a pump in fluidic communication with the water intake and the discharge nozzle, the pump being configured to draw water in through the water intake and expel the water out from the discharge nozzle. In some aspects, the pump is reversible and configured to draw water in through the discharge nozzle and expel the water out from the water intake.

According to some aspects of the present disclosure, the processor determines an optimal position for the first agitation location and the second agitation location in the pool or spa. In further aspects, identifying the first agitation location and identifying the second agitation location are performed by the processor based on user input. The method can also include receiving a user defined map of the pool or spa including a position of the first agitation location and a position of the second agitation location.

According to some aspects of the present disclosure, the method includes receiving an indication that a pump in fluidic communication with a pool or spa skimmer is operational, and expelling pressurized water through the discharge nozzle of the mobile nozzle, based on the indication received.

According to other aspects, the mobile nozzle includes a second discharge nozzle in fluidic communication with the water intake and the discharge nozzle and a valve in fluidic communication with the discharge nozzle, the second discharge nozzle, and water intake. The valve can be configured to control the flow of water between the discharge nozzle, the second discharge nozzle, and the water intake.

BRIEF DESCRIPTION OF THE DRAWINGS

The foregoing features of the present disclosure will be apparent from the following Detailed Description of the Invention, taken in connection with the accompanying drawings, in which:

FIG. 2C is a top view of the mobile nozzle of FIG. 2B;

FIG. 7A is a diagram showing the mobile nozzle cleaning system in a first position of the cleaning cycle of FIG. 6;

FIG. 7B is a diagram showing the mobile nozzle cleaning system in another position of the cleaning cycle of FIG. 6;

FIG. 7C is a diagram showing the mobile nozzle cleaning system in yet another position of the cleaning cycle of FIG. 6;

FIG. 8 is a diagram illustrating exemplary features of another pool or spa in connection with another mobile nozzle cleaning system of the present disclosure;

FIG. 10A is a diagram showing the mobile nozzle cleaning system in a first position of the cleaning cycle of FIG. 9;

FIG. 10B is a diagram showing the mobile nozzle cleaning system in another position of the cleaning cycle of FIG. 9;

FIG. 10C is a diagram showing the mobile nozzle cleaning system in yet another position of the cleaning cycle of FIG. 9;

FIG. 11A is a diagram of another mobile nozzle of the present disclosure, including a system for preventing movement thereof and positioned in a first configuration;

FIG. 11B is a diagram of the mobile nozzle of FIG. 11A, positioned in a second configuration; and FIG. 11C is a diagram of the mobile nozzle of FIG. 11A, including another system for preventing movement thereof.

DETAILED DESCRIPTION

The present disclosure relates to mobile nozzle cleaning systems for pools and spas that dislodge debris from the floors and walls thereof, and direct the dislodged debris to one or more outlets for filtration and/or removal therefrom, as described in detail below in connection with FIGS. 1-11C.

Figure 1:
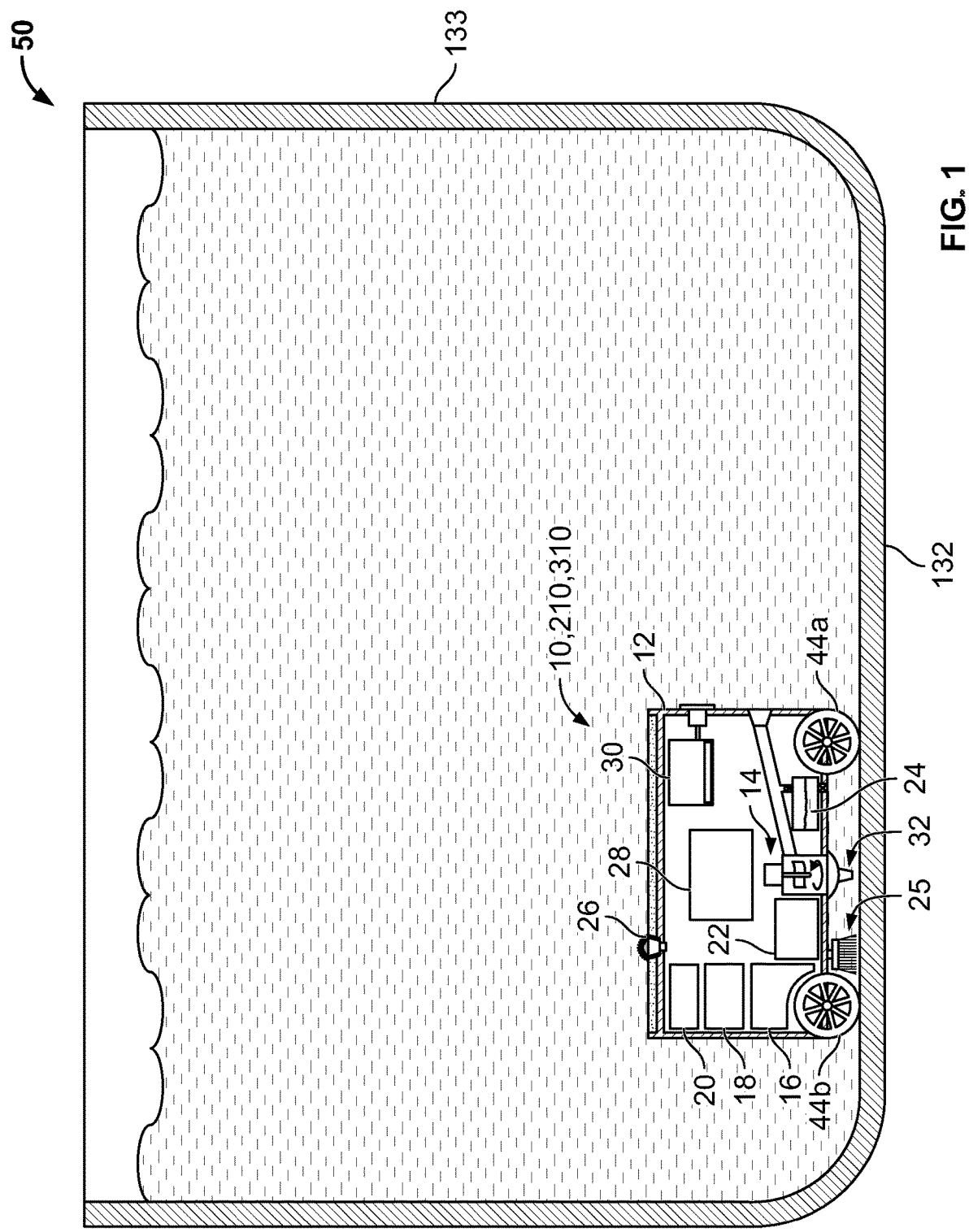
FIG. 1 is a schematic representation depicting the overall operation of a mobile pool or spa cleaning nozzle, hereinafter referred to as a mobile nozzle, according to the present disclosure.

With initial reference to FIG. 1, a mobile pool or spa cleaning nozzle device (hereinafter "mobile nozzle") 10 is provided to dislodge debris from a floor 132, walls 133, and other surfaces of a swimming pool or spa 50. The mobile nozzle 10 includes a water-tight body 12 that is adapted for submersion in the pool or spa 50 and houses one or more of a pump 14, a nozzle 32, a propulsion system 16, wheels 44a-d, a navigation system 18, one or more sensors 20, a nozzle control system 22, a buoyancy system 24, a brush system 25, one or more light sources 26, and a communication and control system 28. Additional aspects of the foregoing systems and/or components of the mobile nozzle 10 are discussed in greater detail herein.

Figure 2A:
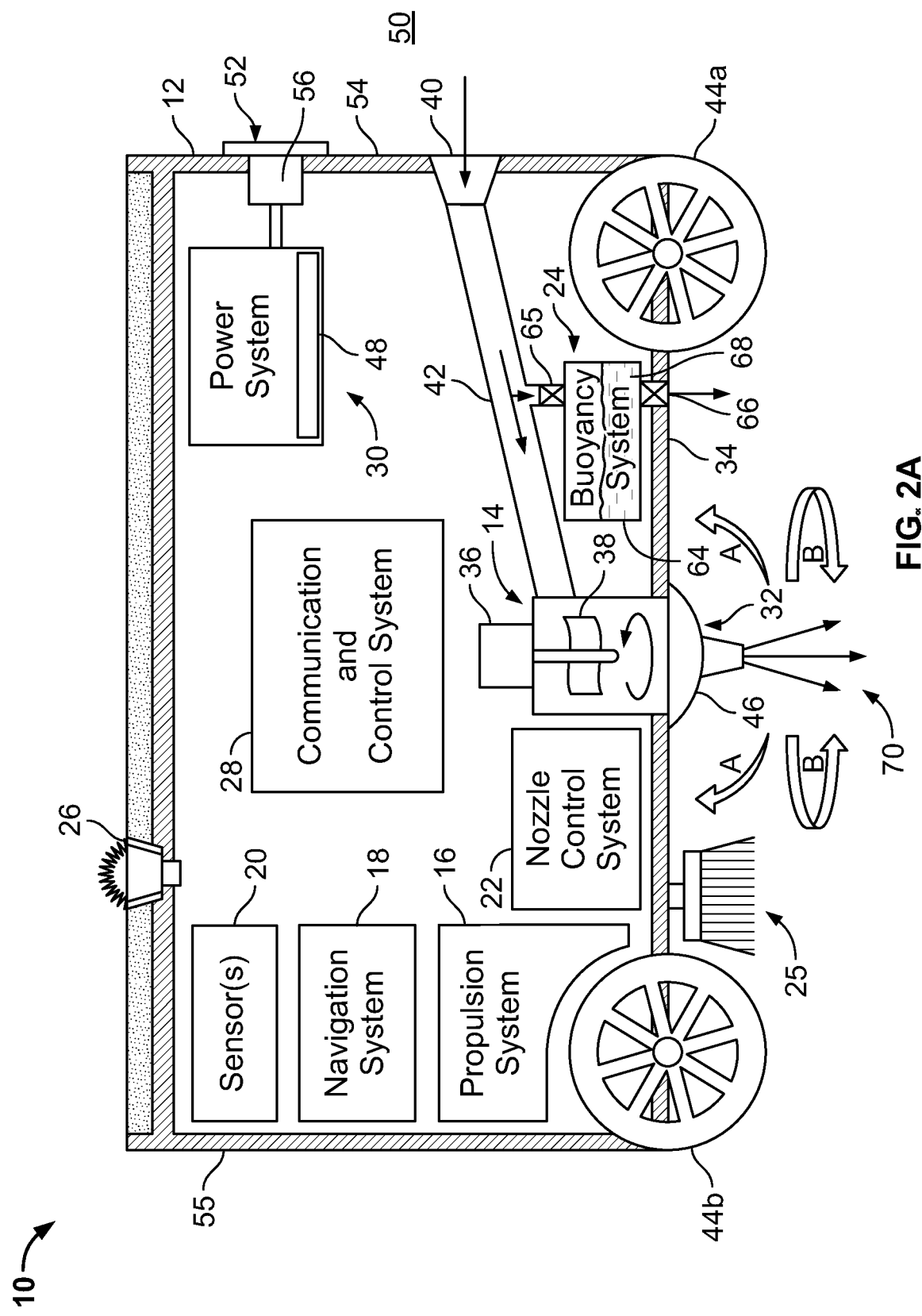
FIG. 2A is a schematic block diagram illustrating components of the mobile nozzle of FIG. 1.

FIG. 2A is a schematic diagram illustrating hardware and software components of the mobile nozzle 10 in greater detail. As shown, the pump 14 is adapted for drawing water into the mobile nozzle 10 and expelling a stream of pressurized water from the nozzle 32 thereof. The propulsion system 16 can include one or more motive systems, such as wheels 44a-d, that enable the mobile nozzle 10 to move about the pool or spa 50. The navigation system 18 is configured to receive and process navigational information from one or more sensors 20 and transmit navigational commands to the propulsion system 16. The nozzle control system 22 is configured to control the orientation of the nozzle 32. The buoyancy system 24 is provided for monitoring and altering the buoyancy of the mobile nozzle 10. The brush system 25 includes a brush and can include means for actuating said brush to "scrub" the floor 132 and/or walls 133 of the pool or spa 50 as the mobile nozzle 10 travels therealong. The one or more light sources 26 are provided for illuminating the pool or spa 50 and allow the mobile nozzle 10 to function as a submerged mobile lighting system that is viewable by a user or swimmer. The communication and control system 28 can be configured to provide communication between, and control of, one or more of the foregoing systems and one or more remote devices or computer systems. The power system 30 is configured to provide electrical energy to one or more of the foregoing systems and/or components. The pump 14, the propulsion system 16, the navigation system 18, the sensors 20, the nozzle control system 22, the buoyancy system 24, the light sources 26, and/or the power system 30 can be communicatively coupled to the communication and control system 28 and can therefore communicate with each other. Additional aspects of the foregoing systems and/or components of the mobile nozzle 10 are discussed in greater detail herein. It is also noted that or more of the foregoing systems and/or components may not be located within the body 12, but can be positioned on the exterior of the body 12, or can extend from an interior of the body 12 to an exterior thereof, such as the wheels 44a-d of the propulsion system 16.

The nozzle 32 can be positioned on an underside of a bottom wall 34 of the mobile nozzle 10 and is in fluid communication with the pump 14. The pump 14 can include a motor 36 configured to rotatably drive an impeller 38, which, when rotatably driven, draws water from the pool or spa 50 into an inlet 40 positioned on a sidewall 54 of the body 12, through a water supply conduit 42, into the pump 14, and expels the water through the nozzle 32 as a pressurized stream of water 70 that dislodges debris that has settled on the pool or spa 50 floor (e.g., floor 132 described in connection with FIGS. 4A and 4B). Alternatively, the nozzle 32, or one or more additional nozzles, can be positioned on other sidewalls 54 of the body 12, such as for example, a front wall 55 (see FIG. 2B). Similarly, the inlet 40 could be positioned on other walls of the body 12, such as for example, on a bottom wall 34 (see FIG. 2C), or elsewhere.

The motor 36 can also be configured to rotatably drive the impeller 38 in a reverse direction in order to expel any debris (e.g., leaves or other pool/spa debris) that has been drawn into the inlet 40, which would otherwise hinder performance of the mobile nozzle 10 if not removed. For example, when the motor drives the impeller 38 in a reverse direction, water is drawn from the pool or spa 50 through the nozzle 32, into the pump 14, through the water supply conduit 42, and expelled through the inlet 40, along with debris that may have been lodged within the mobile nozzle 10. The mobile nozzle 10 can reverse the direction of the motor 36 periodically (e.g., per a predetermined maintenance schedule) or upon detecting a blockage due to debris (e.g., by detecting that the motor 36 is drawing increased current, indicating a blockage).

The nozzle 32 can be fixed in a single orientation and/or direction relative to the body 12. Alternatively, the nozzle 32 can be rotatable and/or pivotable between one more different orientations and/or directions relative to the body 12. For example, the nozzle 32 can be fixed in a substantially vertical orientation (such as the vertical orientation shown in FIG. 2A) such that it expels the pressurized stream of water directly toward and normal to the floor 132 of the pool or spa 50 to dislodge and/or agitate debris that has settled thereon, or the nozzle 32 can be fixed in a substantially horizontal orientation (such as the horizontal orientation shown in FIGS. 11A and 11B) such that it expels the pressurized stream of water generally parallel with the floor 132 of the pool or spa 50 to dislodge the debris from the floor 132 and "push" the debris toward a desired location, such as a drain or collection zone, as will be discussed in greater detail herein in connection with FIGS. 5-10C. Alternatively, the nozzle 32 can be rotatable and/or pivotable, or otherwise movable, between the vertical and horizontal positions described above. However, it should also be understood that the nozzle 32 can be movable to a plurality of orientations relative to the body 12 other than the above described vertical and horizontal positions, allowing the mobile nozzle 10 to agitate or push debris in a plurality of directions while remaining stationary.

For example, as shown in FIG. 2A, the nozzle 32 can be fluidly coupled to the pump 14 by way of a spherical, or other infinitely variable, fitting 46 and can be pivoted in the direction of arrows A and rotated in the direction of arrows B, thereby providing for adjustment of the nozzle 32 in a plurality of orientations with respect to the bottom wall 34 of the body 12. As but one example, the nozzle 32 can perform a sweeping motion as it rotates back and forth in the direction of arrows B. The fitting 46 can also be coupled to the nozzle control system 22, which can include mechanical and/or electrical means for selectively altering the orientation of the nozzle 32, such as one or more motors, gearing, positional sensors, and the like. Those of ordinary skill in the art will understand that additional means for selectively controlling and/or altering the orientation of the nozzle 32 can be employed without departing from the spirit and scope of the present disclosure.

The propulsion system 16 includes one or more motive systems that move the mobile nozzle 10 about the pool or spa 50. For example, as shown in FIG. 2A, the mobile nozzle 10 can include wheels 44a-d that are driven and controlled by the propulsion system 16, which can include a motor, gearing, etc. In this exemplary configuration, the propulsion system 16 can cause two or more of the wheels to move in the same direction and speed in order to move in a linear (e.g., forward or reverse) direction. Similarly, the propulsion system 16 can cause two or more of the wheels to move in different directions and/or speeds in order to cause the mobile nozzle 10 to change orientation (e.g., turn or pivot). Those of ordinary skill in the art will understand that the wheels 44a-d are but one example of a motive system that can be implemented to move the mobile nozzle 10 about the pool or spa 50, and other motive systems can be employed without departing from the spirit and scope of the present disclosure, such as one or more continuous treads, or propulsion by way of a pressurized stream of water, discussed in connection with FIG. 2B.

The navigation system 18, in combination with the propulsion system 16 and the one or more sensors 20, can control movement of the mobile nozzle 10 about the pool or spa 50. For example, the navigation system 18 can receive information from the one or more sensors 20, process the sensor information to determine a current and/or desired orientation and position, and can transmit an instruction to the propulsion system 16 (e.g., change orientation x degrees, move forward y feet, etc.), which carries out the instruction to arrive at the desired orientation and position. The sensors 20 can include one or more optical sensors, proximity sensors, RFID sensors, acoustic (e.g., sonar) sensors, inductive loop sensors, and the like. In the case of acoustic sensors, frequencies in the range of 3-300 Hz are ideally suited for underwater communication, but it should be understood that frequencies exceeding 300 Hz can also be used. According to some embodiments of the present disclosure, one or more navigational beacons can positioned in the pool or spa. Accordingly, the sensors 20 can include one or more devices capable of detecting and/or communicating with the beacons, which the navigation system 18 can communicate with in determining a desired orientation and position for the mobile nozzle 10. According to further embodiments of the present disclosure, the navigation system 18 can also include, and/or be in communication with one or more vision systems and/or sensors capable of identifying debris within the pool or spa 50, such that the mobile nozzle 10 can identify the location of debris and travel thereto. Additional aspects of the navigation system 18 are discussed in greater detail herein.

As referenced above, the power system 30 is configured to provide electrical energy to one or more of the systems and/or components of the mobile nozzle 10 and can include one or more of a rechargeable battery, capacitor, or other replenishable energy storage device 48 (hereinafter "battery 48") and can be adapted to receive energy from an inductive power coupling 52. In this regard, the inductive power coupling 52 can be configured to inductively receive electrical power from a corresponding inductive power coupling 136 that is connected to and receives power from a power source 140 (see FIGS. 4A and 4B), thereby enabling the mobile nozzle 10 to traverse the pool or spa 50 without being tethered to an external power source. The coupling 52 includes a water-tight housing 56 containing an inductor circuit which allows for the inductive reception of electrical power. The housing 56 could be made of a plastic material such as polyvinyl chloride (PVC) or any other sturdy waterproof material that does not interfere with electrical field transmission, and which is an electrical insulator. It should be understood that other materials could be utilized in constructing the housing 56. As shown in FIG. 2A, one or more inductive couplings 52 can be disposed through one or more sidewalls 54, or other surfaces, of the mobile nozzle 10 and can be sealingly attached thereto, so as to maintain the water-tight integrity of the body 12. Additionally and/or alternatively, the one or more inductive couplings 52 can be positioned on other sidewalls 54 of the body 12, such as for example, the bottom wall 34. Additional aspects of the power system 30, with specific regard to features of the inductive power coupling, are discussed in greater detail in connection with FIGS. 4A and 4B. Alternatively or in addition to the battery 48 and the inductive power coupling 52, the power system 30 can be directly coupled to, and receive power from the power source 140 by way of a cord, cable, power conduit, or other means for conducting electrical energy.

According to embodiments of the present disclosure, the power system 30 can provide electrical energy to one or more of the systems and/or components of the mobile nozzle 10 via the communication and control system 28 or the power system 30 can provide electrical energy to one or more of the systems and/or components of the mobile nozzle 10 via a direct connection thereto. For example, the power system 30 can provide power to low-power systems, such as one or more of the sensors 20, via the communication and control system 28, and the power system 30 can provide power to one or more high-power systems, such as the motor 36, via a direct electrical connection thereto.

Figure 2B:
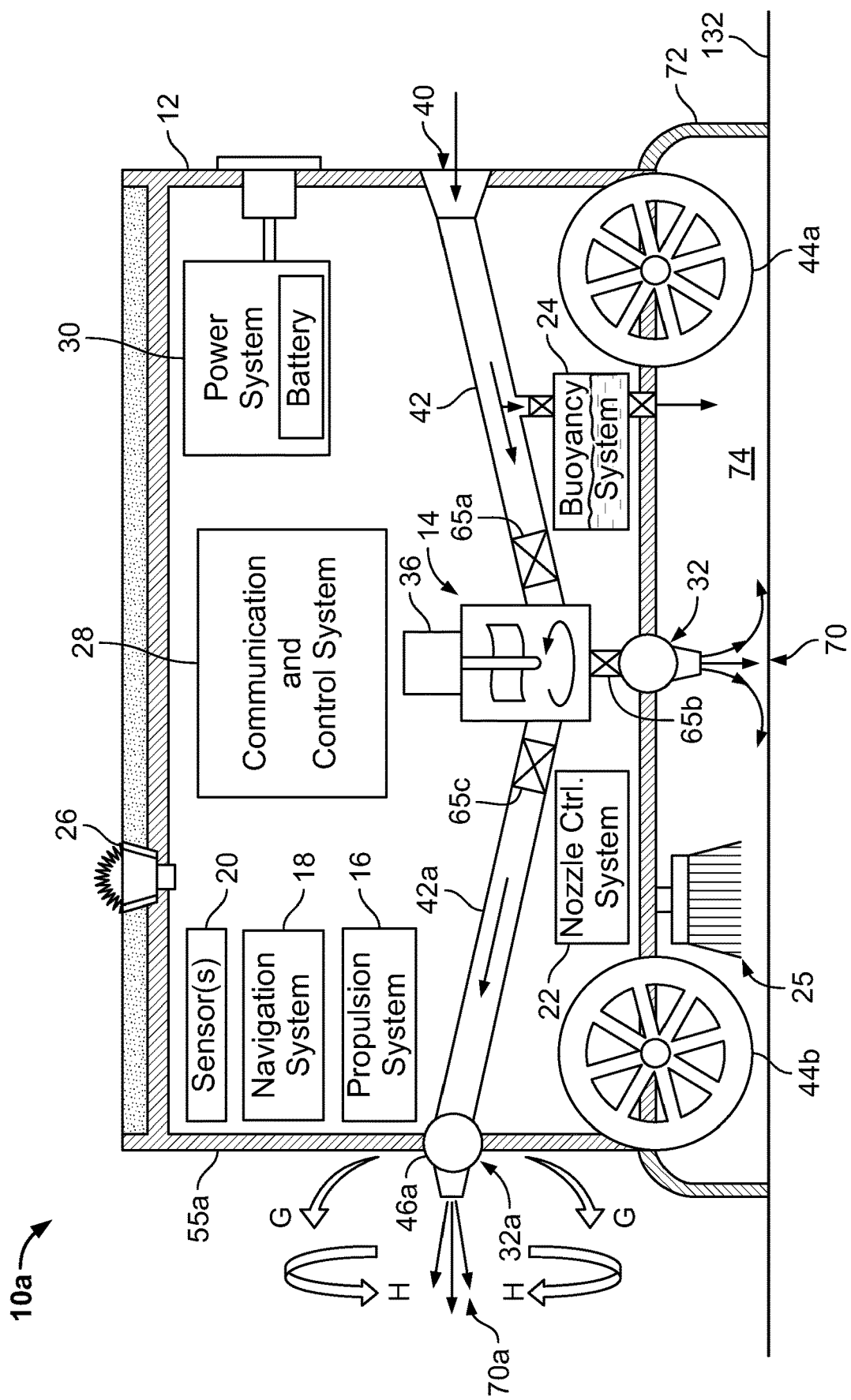
FIG. 2B is a schematic block diagram illustrating components of another mobile nozzle of the present disclosure.

FIGS. 2B and 2C are schematic diagrams illustrating hardware and software components of another mobile nozzle 10a of the present disclosure. Specifically, FIG. 2B is a partial cross-sectional diagram of the mobile nozzle 10a and FIG. 2C is a top view of the mobile nozzle 10a. The mobile nozzle 10a can be substantially similar in construction to the mobile nozzle 10 described in connection with FIGS. 1 and 2A. Accordingly, the mobile nozzle 10a can include one or more of the pump 14, nozzle 32, propulsion system 16, wheels 44a-d, navigation system 18, sensors 20, nozzle control system 22, buoyancy system 24, brush system 25, light sources 26, communication and control system 28, and power system 30, as shown and described in connection with mobile nozzle 10 and FIG. 2A. The mobile nozzle 10a can also include a second nozzle 32a (e.g., in addition to, or in place of, the nozzle 32). Similar to the operation of nozzle 32, the pump 14 can include the motor 36 configured to rotatably drive the impeller 38, which, when rotatably driven, draws water from the pool or spa 50 into the inlet 40, through water supply conduit 42, into the pump 14, and through a water conduit 42a, and expels the water through the nozzle 32a as a pressurized stream of water 70a.

As shown in FIG. 2B, the nozzle 32a can be fluidly coupled to the pump 14 by way of a spherical, or other infinitely variable, fitting 46a and can be pivoted in the direction of arrows G, rotated in the direction of arrows H, and swept in the direction of arrow I (see FIG. 2C), thereby providing for adjustment of the nozzle 32a in a plurality of orientations with respect to the front wall 55a of the mobile nozzle 10a. As one example, the nozzle 32a can perform a sweeping motion back and forth in the direction of arrow I as it pivots back and forth in the direction of arrows G in order to dislodge debris from the floor 132 and/or walls 133 of the pool or spa 50. According to aspects of the present disclosure, one or more of the nozzles 30, 32a can supplement, or act as, the propulsion system 16 of the mobile nozzle 10a, in addition to directing a stream of water to dislodge debris from the floor 132 and/or walls 133 of the pool or spa 50. In such a configuration, the wheels 44a-d can be retracted into the mobile nozzle 10a, or the mobile nozzle 10a can be provided without the wheels 44a-d. For example, nozzle 32a can be controlled to be positioned toward the floor 132 of the pool or spa 50 to dislodge debris therefrom and then positioned to provide propulsion (e.g., generally horizontally) and directional control (e.g., by rotation in the direction of arrow I) for the mobile nozzle 10a. Additionally, the nozzle 32 can provide lift and/or supplemental propulsion. Furthermore, the mobile nozzle 10a can also include controllable valves 65a-c to selectively control the flow of water through the inlet 40, nozzle 32, and nozzle 32a. Accordingly, the mobile nozzle 10a can optimize lift, buoyancy, propulsion, and cleaning performance by selectively controlling the flow of water through the inlet 40, nozzle 32, and nozzle 32a by way of the valves 65a-c.

According to further embodiments of the present disclosure, the mobile nozzle 10a can include a skirt 72 configured to assist with providing lift to the mobile nozzle 10a while the mobile nozzle 10a traverses the pool or spa 50, and/or to anchor the mobile nozzle 10a to the floor 132 of the pool or spa 50 during cleaning. For example, as shown in FIGS. 2B and 2C, the skirt 72 can be disposed around a lower portion of the body 12 of the mobile nozzle 10a and extend to the floor 132 of the pool or spa 5. The skirt 72 defines a central plenum 74, such that as the stream of water 70 is expelled from the nozzle 32 it is distributed within the central plenum 74. This configuration creates a higher pressure region within the central plenum 74 compared to the water surrounding the mobile nozzle 10a, with pressurized water only capable of escaping at the interface of the skirt 72 and the floor 132. Accordingly, as the water escapes from the skirt 72, the mobile nozzle 10a is lifted and can "hover" just above the floor 132. Alternatively, the mobile nozzle 10a can create a negative pressure within the central plenum 74 by drawing water through the nozzle 32. For example, the mobile nozzle 10a can reverse operation of the motor 14 and/or close valve 65a in communication with the inlet 40, thereby creating a negative pressure within the central plenum and generating a suction effect. The valve 65c can remain open, thereby allowing the mobile nozzle 10a to be securely anchored to the floor 132 while the nozzle 32a remains operational to perform a cleaning operation. After completing the cleaning operation, the mobile nozzle 10a can reverse the direction of the motor and/or actuate one or more of the valves 65a-c to release the mobile nozzle 10a from the floor 132, and the mobile nozzle can then move to another location.

Figure 2D:
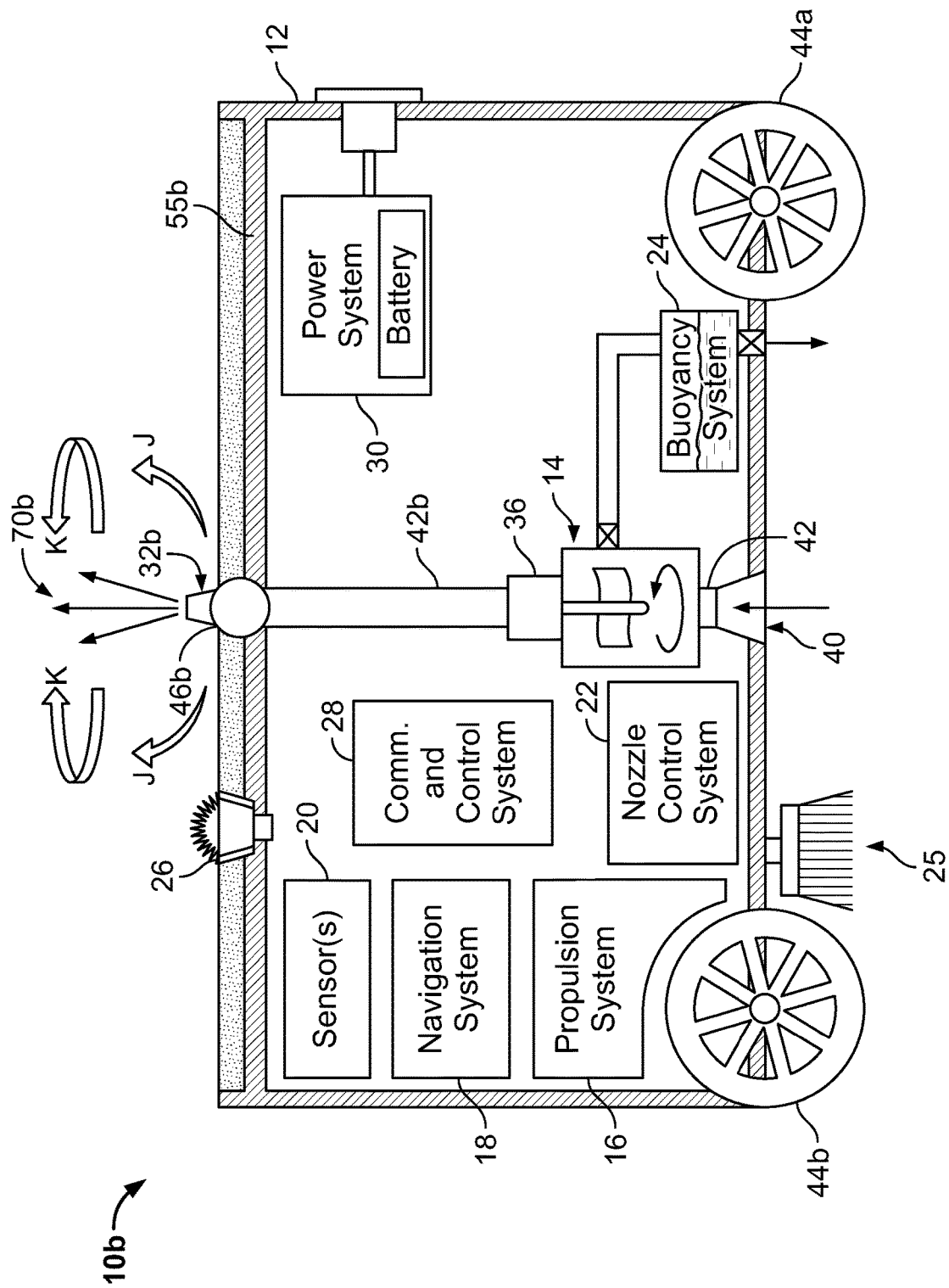
FIG. 2D is a schematic block diagram illustrating components of another mobile nozzle of the present disclosure.

FIG. 2D is a schematic diagram illustrating hardware and software components of another mobile nozzle 10b of the present disclosure. The mobile nozzle 10b can be substantially similar in construction to the mobile nozzle 10 described in connection with FIGS. 1 and 2A. Accordingly, the mobile nozzle 10b can include one or more of the pump 14, propulsion system 16, wheels 44a-d, navigation system 18, sensors 20, nozzle control system 22, buoyancy system 24, brush system 25, light sources 26, communication and control system 28, and power system 30, as shown and described in connection with mobile nozzle 10 and FIG. 2A. The mobile nozzle 10b can also include a nozzle 32b in fluidic communication with the motor 14 by way of a water conduit 42b. Similar to the operation of nozzle 32, described in connection with FIG. 2A, the pump 14 can include the motor 36 configured to rotatably drive the impeller 38, which, when rotatably driven, draws water from the pool or spa 50 into the inlet 40, through water supply conduit 42, into the pump 14, and through the water conduit 42b, and expels the water through the nozzle 32b as a pressurized stream of water 70b.

The mobile nozzle 10b can also reverse the direction of the motor 36, thereby drawing water through the nozzle 32b, into the pump 14, and out through the inlet 40, thereby providing lift and allowing the mobile nozzle 10b to exit a niche (e.g., niche 130, shown and described in connection with FIGS. 4A and 4B) in the floor 132 of the pool or spa 50, ascend within the pool or spa 50, and/or move between stairs of the pool or spa 50. For example, if the batteries of mobile nozzle 10b are nearly drained (e.g., below a predetermined threshold) and recharging is not possible, the mobile nozzle 10b can ascend to the surface of the pool and draw air therein, such that the mobile nozzle 10b remains buoyant and floats at the water surface allowing it to be easily retrieved. Alternatively, as described herein, the mobile nozzle 10b can ascend to the surface of the pool or spa 50 when instructed by a user.

The nozzle 32b can be fluidly coupled to the pump 14 by way of a spherical, or other infinitely variable, fitting 46b and can be pivoted in the direction of arrows J, rotated in the direction of arrows K, and swept in the direction, for example, of arrow I (see FIG. 2C), thereby providing for adjustment of the nozzle 32b in a plurality of orientations with respect to a top wall 55b of the mobile nozzle 10b. As one example, the nozzle 32b can perform a sweeping motion back and forth in the direction of arrow I as it pivots back and forth in the direction of arrows J in order to agitate debris within the pool or spa 50 for eventual removal, or direct debris suspended in the pool water toward a skimmer.

Figure 2E:
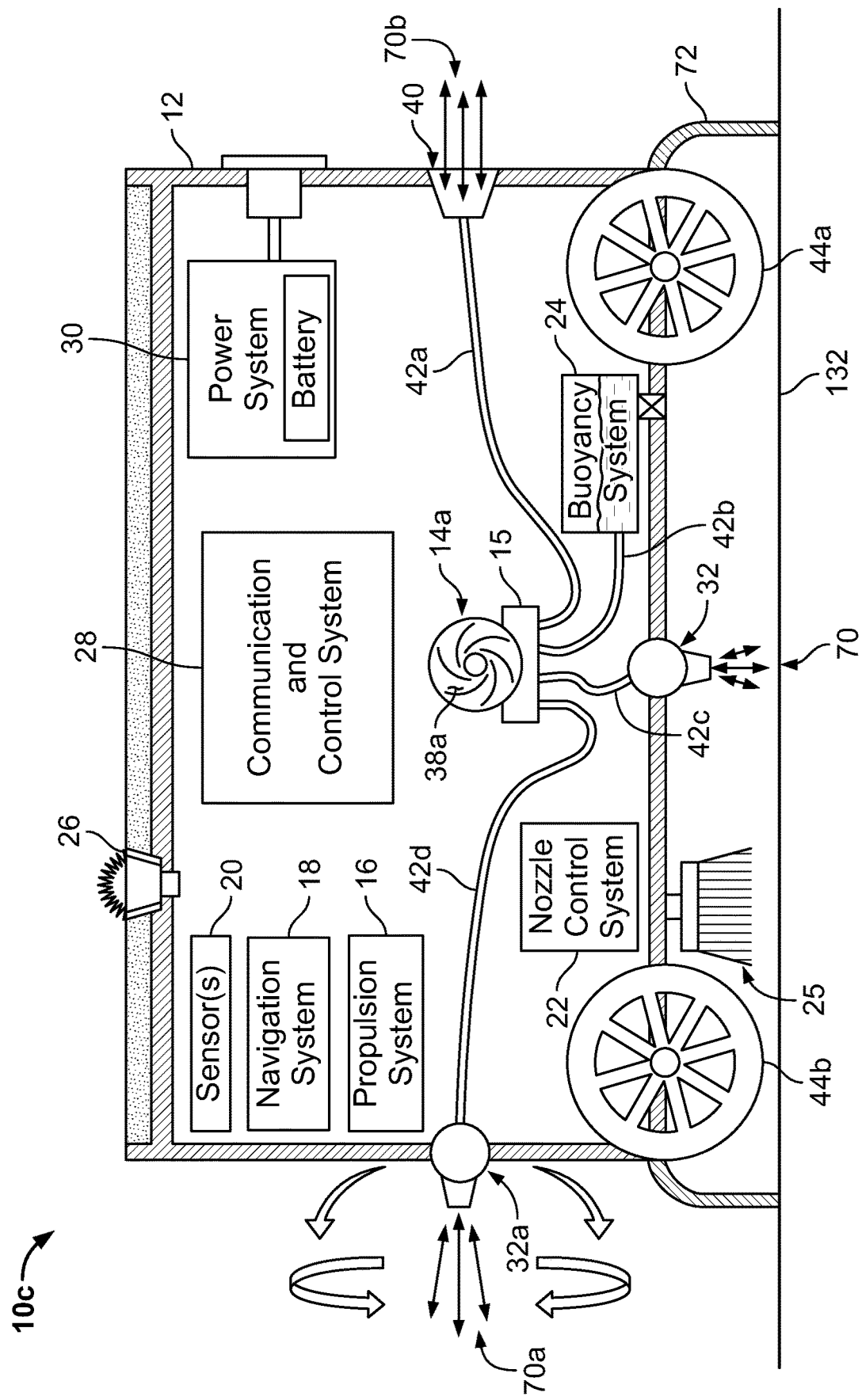
FIG. 2E is a schematic block diagram illustrating components of another mobile nozzle of the present disclosure.

FIG. 2E is a schematic diagram illustrating hardware and software components of another mobile nozzle 10c of the present disclosure. The mobile nozzle 10c can be substantially similar in construction to the mobile nozzle 10a described in connection with FIGS. 2B and 2C. For example, the mobile nozzle 10c can include one or more of the nozzles 32, 32a, water inlet 40, propulsion system 16, wheels 44a-d, navigation system 18, sensors 20, nozzle control system 22, buoyancy system 24, brush system 25, light sources 26, communication and control system 28, power system 30, and skirt 72 as shown and described in connection with mobile nozzle 10a of FIGS. 2B and 2C. The mobile nozzle 10c can also include a pump assembly 14a, a water distribution manifold 15, and a plurality of water supply conduits 42a-d which fluidly couple the water inlet 40, the buoyancy system 24, and nozzles 32, 32a to the water distribution manifold 15. The water distribution manifold 15 is can also be fluidly coupled to the inlet and/or outlet of the pump assembly 14a and can be communicatively coupled to one or more systems (e.g., communication and control system 28) of the mobile nozzle 10c. Additionally, the water distribution manifold 15 can include a plurality of valves (not shown) that can be selectively controlled (e.g., by way of communication and control system 28) to direct water through the inlet of the pump assembly 14a from one or more of the water supply conduits 42a-d. Likewise, the water distribution manifold 15 can be selectively controlled to direct water from the outlet of the pump assembly 14a through another of the one or more water supply conduits 42a-d. According to some embodiments of the present disclosure, a first water distribution manifold 15 could be coupled to the inlet of the pump assembly 14a and/or a second water distribution manifold 15 could be coupled to the outlet of the pump assembly. According to further embodiments, the first and second water distribution manifolds 15 could also be fluidly coupled, such that water can be directed therebetween without passing through the pump assembly 14a.

The pump assembly 14a can include a motor (not shown) configured to rotatably drive an impeller 38a, which, when rotatably driven, can draw water from the pool or spa 50 through one or more of the inlet 40 and nozzles 32, 32a, through one or more of the water supply conduits 42a-d, through the water distribution manifold 15, into the pump 14, out through the water distribution manifold 15 and one or more of the water supply conduits 42a-d, and expels the water through one or more of the nozzles 32, 32a and inlet 40 as a pressurized stream of water (e.g., water streams 70, 70a, 70b). Accordingly, the mobile nozzle 10c can selectively draw water through one or more of the inlet 40 and nozzles 32, 32a and expel the water through one or more of the nozzles 32, 32a and inlet 40, without requiring that the rotational direction of the motor be reversed.

As shown in FIG. 2E, the nozzles 32, 32a can be fluidly coupled to the pump assembly 14a by way of spherical, or other infinitely variable, fittings 46, 46a, thereby providing for adjustment of the nozzles 32, 32a in a plurality of orientations with respect to the mobile nozzle 10c. As one example, the nozzle 32a can perform a sweeping motion and pivot back and forth in order to dislodge debris from the floor 132 and/or walls 133 of the pool or spa 50. According to aspects of the present disclosure, one or more of the nozzles 30, 32a can supplement, or act as, the propulsion system 16 of the mobile nozzle 10a, in addition to directing a stream of water to dislodge debris from the floor 132 and/or walls 133 of the pool or spa 50. For example, nozzle 32a can be controlled to be positioned toward the floor 132 of the pool or spa 50 to dislodge debris therefrom and then positioned to provide propulsion (e.g., generally horizontally) and directional control for the mobile nozzle 10a. Additionally, the nozzle 32 can provide lift, suction, and/or supplemental propulsion.

As similarly discussed in connection with the mobile nozzle 10a, the skirt 72 can be configured to assist with providing lift to the mobile nozzle 10c while the mobile nozzle 10c traverses the pool or spa 50, and/or to anchor the mobile nozzle 10c to the floor 132 of the pool or spa 50 during cleaning. For example, the mobile nozzle 10c can create a high pressure region within the skirt 72 by directing the stream of water 70 out through the nozzle 32, allowing the mobile nozzle 10c to be lifted and "hover" just above the floor 132 and, conversely, can create a negative pressure region within the skirt 72 by drawing water through the nozzle 32, thereby generating a suction force that anchors the mobile nozzle 10c to the floor 132.

As described, the water distribution manifold 15 of the mobile nozzle 10c can include controllable valves to selectively control the flow of water through the inlet 40, nozzle 32, and nozzle 32a. Accordingly, the mobile nozzle 10a can optimize lift, buoyancy, propulsion, and cleaning performance by selectively controlling the flow of water through the inlet 40, nozzle 32, and nozzle 32a by way of water distribution manifold 15. For example, the mobile nozzle 10a can control the water distribution manifold 15 to prevent the flow of water through the inlet 40, draw water through nozzle 32, and expel the water through nozzle 32a, thereby maximizing the negative pressure within the skirt 72 and securely anchoring the mobile nozzle 10c to the floor 132, while also maximizing the flow of water through nozzle 32a to perform a cleaning operation. After completing the cleaning operation, the mobile nozzle 10c can control the water distribution manifold 15 to allow the flow of water through the inlet 40 and expel water through nozzle 32 and through nozzle 32a, thereby releasing the mobile nozzle 10c from the floor 132, providing lift via nozzle 32, and providing propulsion and/or directional control via nozzle 32a.

Figure 3:
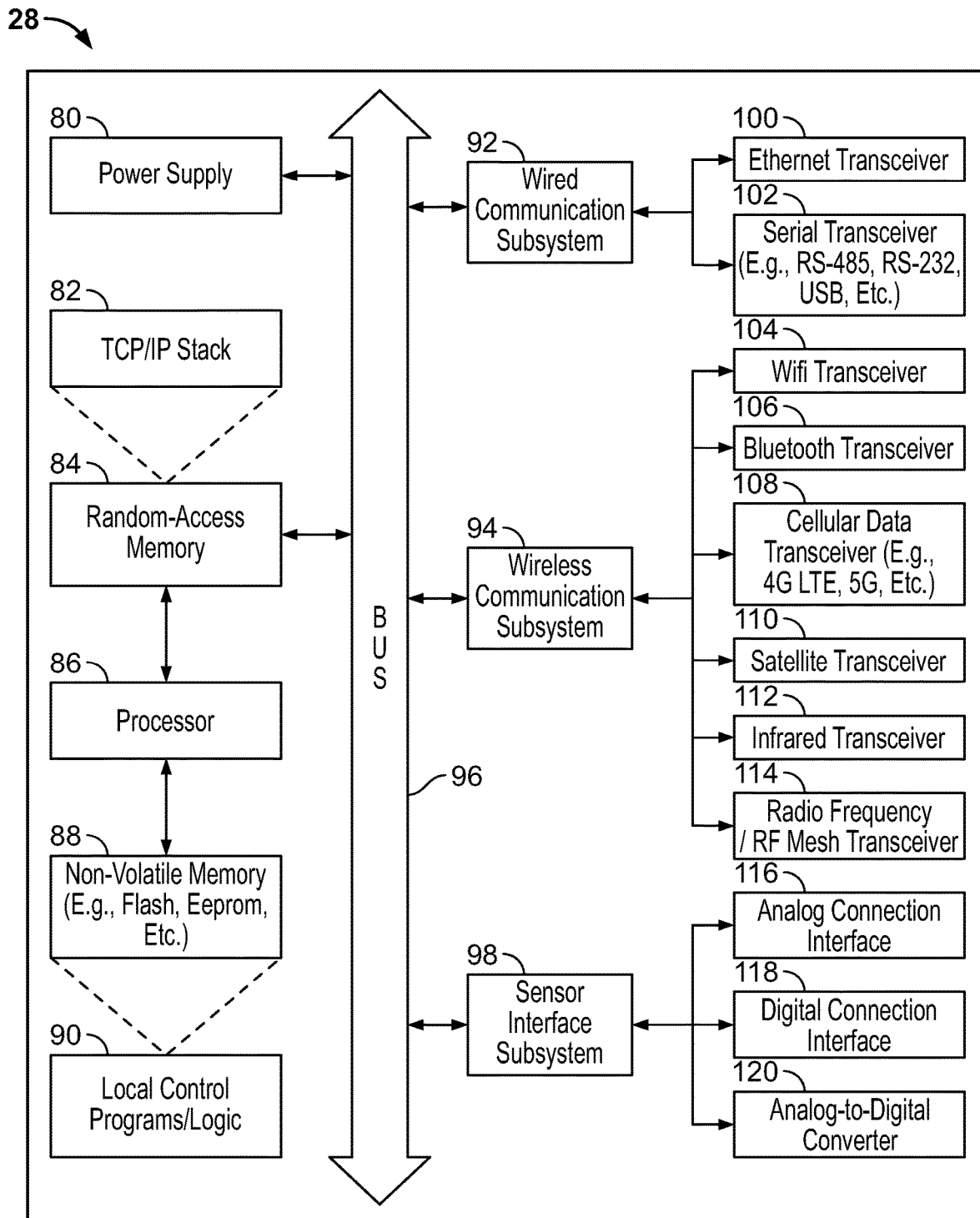
FIG. 3 is a block diagram illustrating components of a communication and control system of the mobile nozzle of FIG. 1.

FIG. 3 is a block diagram illustrating components of the communication and control system 28 of the monitoring device 12 of FIG. 2A in greater detail. It should also be understood by those of ordinary skill in the art that, according to some embodiments or the present disclosure, the communication and control system 28 can include or embody features of one or more of the propulsion system 16, the navigation system 18, the sensors 20, the nozzle control system 22, the buoyancy system 24, the light sources 26, and the power system 30.

A power supply 80 provides the communication and control system 28 with power and can also provide power to one or more components and/or systems electrically coupled to the communication and control system 28. For example, the power supply 80 can be in electrical communication with, and receive power from, the power system 30, discussed in connection with FIG. 2A. According to some embodiments of the present disclosure, the power supply 80 can also can include a lithium ion battery, a capacitor, or other form of replenishable/rechargeable energy storage device known to those of ordinary skill in the art. According to some embodiments, the power supply 80 could have ON/OFF capability such that the communication and control system 28 could be powered ON when necessary and turned OFF when not in use to prolong battery life.

A processor 86 provides local processing capability for the communication and control system 28. The processor 86 is in communication with a random access memory 84, and one or more non-volatile memories 88. The non-volatile memory 88 could store one or more local programs 90 for providing local control of the communication and control system 28 and other systems in communication therewith. The control programs 90 can be, for example, polling schedules for the one or more sensors 20, or cleaning schedules, as described in connection with FIGS. 5-10C. A TCP/IP stack 82 is provided for allowing the communication and control system 28 to obtain an Internet protocol address, and to provide Internet connectivity and/or other remote communication for the mobile nozzle 10. The processor 86 could communicate with a wired communication subsystem 92, a wireless communication subsystem 94 and a sensor interface subsystem 98 by way of a bus 96.

As shown, the communication and control system 28 can provide for a wide variety of wired and wireless connections to the mobile nozzle 10. For example, the wired communication subsystem 92 can communicate with an Ethernet transceiver 100 and a serial transceiver 102. The serial transceiver 102 could support one or more suitable serial communication protocols, such as RS-485, RS-232, USB, etc., and can be utilized for communication with one or more of the internal systems (e.g., the propulsion system 16, the navigation system 18, the nozzle control system 22, the buoyancy system 24, the power system 30, etc.) of the mobile nozzle 10 and for communication with an external device, such as a computer or mobile device, employed for programming and/or configuration of the mobile nozzle 10. The wireless communication subsystem 94 could include a Wi-Fi transceiver 104, a Bluetooth (or Bluetooth LE) transceiver 106, a cellular data transceiver 108, a satellite transceiver 110, an infrared transceiver 112, and a radiofrequency/RF mesh transceiver 114. The cellular data transceiver 108 could support one or more cellular data communications protocols, such as 4G, LTE, 5G, etc. The radiofrequency/RF mesh transceiver 114 could support one or more RF mesh network protocols, such as ZWave, Zigbee, Thread, Weave, etc. Accordingly, the mobile nozzle 10 could connect to a mobile device and/or a remote server or "cloud" platform via the communication and control system 28 to allow for remote and/or web-based control thereof. For example, the mobile nozzle 10 could communicate with a user's mobile device, such that the user could program a cleaning schedule, remotely and manually control operation of the mobile nozzle 10, and designate a point in the pool or spa 50 where the mobile nozzle 10 can surface for servicing, should any be required. The radiofrequency/RF mesh transceiver 114 could also communicate with one or more navigational beacons or secondary mobile nozzles, as described herein.

The sensor interface subsystem 98 could include an analog connection interface 116, a digital connection interface 118, and one or more analog-to-digital converters 120. The sensor interface subsystem 98 allows the communication and control system 28 to obtain information from the one or more sensors 20 discussed herein, as well as a wide variety of other sensors that can be associated with the mobile nozzle 10. In this regard, it should be understood that the other types of sensors are contemplated for integration and/or use with the mobile nozzle 10. The wired communication subsystem 92 and/or the wireless communication subsystem 94 allow the communication and control system 28 to connect to a network (e.g., the Internet) via one or more of the communication means described above, or other communication means known to those of ordinary skill in the art. This allows the mobile nozzle 10 to transmit data to one or more remote computer systems, as well as to be remotely controlled by such systems.

Figure 4A:
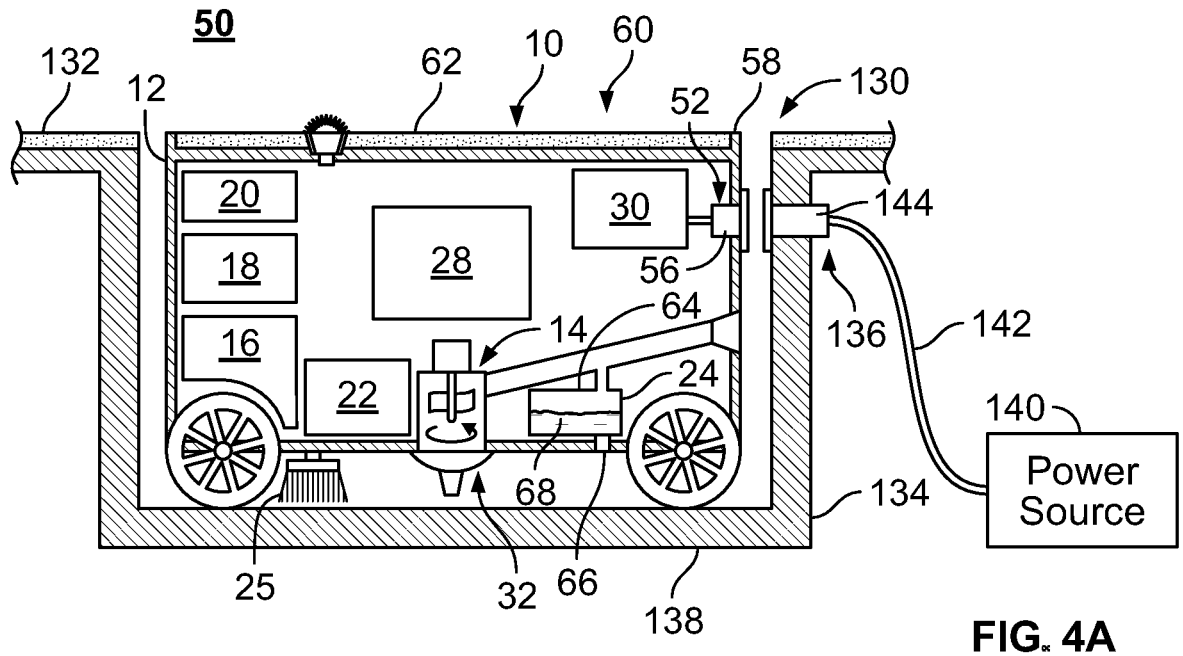
FIG. 4A is a diagram illustrating the mobile nozzle of FIG. 1 positioned within a floor niche of a pool or spa.
Figure 4B:
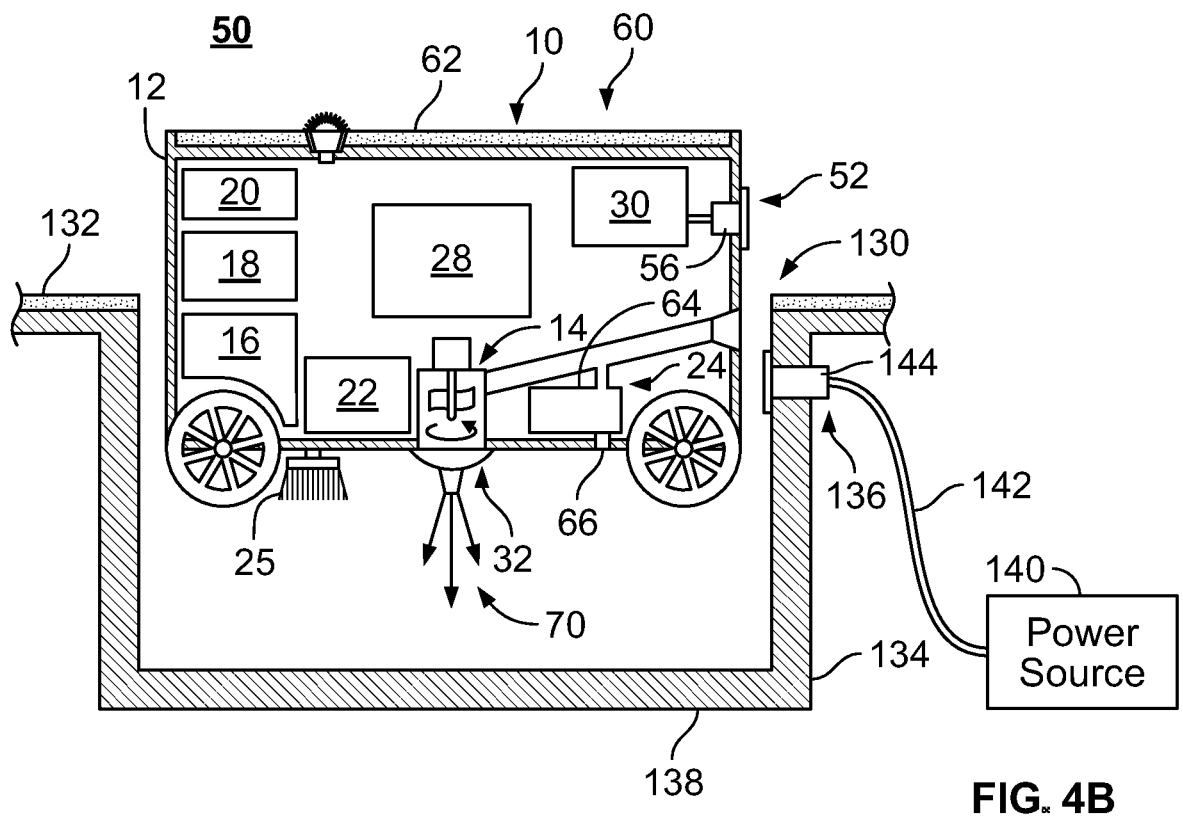
FIG. 4B is a diagram illustrating the mobile nozzle of FIG. 1 exiting the floor niche of FIG. 4A.

FIGS. 4A and 4B are diagrams illustrating a docking niche 130 located in a floor 132 of the pool or spa 50 configured to receive, and to provide power to, the mobile nozzle 10. More specifically, FIG. 4A is a diagram illustrating the mobile nozzle 10 positioned within the niche 130 and FIG. 4B is a diagram illustrating the mobile nozzle 10 exiting the niche 30.

As shown, one or more reciprocal inductive power couplings 136 can be installed in walls 134 of the niche 130. Of course, one or more of the couplings 136 could also be installed in the floor 138 of the niche 130. The niche 130 can also be formed as a separate structure (e.g., a basket) that includes the one or more couplings 136 and can be installed in an existing pool or spa recess, e.g., by being inserted into the recess. Alternatively, the walls 134 and the floor 138 of the niche 130 can be integrally formed in/with the walls 133 and/or floor 132 of the pool or spa 50. Further still, one or more of the couplings 136 could be also be installed in one or more walls of the pool or spa 50, such that the mobile nozzle 10 can inductively receive power therefrom, without entering the niche 130.

A power source 140 provides electrical power to the inductive power coupling 136 via a conduit 142, which can extend below ground. The inductive power coupling 136 and the power conduit/cable 142 function to provide for inductive transmission of electrical energy from the power source 140 to the inductive power coupling 52 of the mobile nozzle 10. As shown in FIG. 4A, the reciprocal inductive power couplings 52, 136 can be positioned on the mobile nozzle 10 and within the niche 130, respectively, such that they are aligned and/or in contact so as to be inductively coupled when the mobile nozzle 10 is positioned within the niche 130.

Similar to the inductive power coupling 52 of the mobile nozzle 10, the coupling 136 includes a housing 144 which is generally embedded in the wall 134 of the niche 130 or one or more other walls of pool or spa 50. The housing 144 could be made of a plastic material such as polyvinyl chloride (PVC) or any other sturdy waterproof material that does not interfere with electrical field transmission, and which is an electrical insulator. It should be understood that other materials could also be utilized in constructing the housing 144. The housing 144 encloses an inductor circuit, which is connected to the power conduit 142, thereby providing power to the coupling 136 and allowing for the inductive transmission of electrical power to the mobile nozzle 10.

According to some embodiments of the present disclosure, the inductive power couplings 52, 136 of the mobile nozzle 10 and niche 130, respectively, can be configured to mate or otherwise be mechanically or magnetically coupled to each other, thereby providing a stable inductive power transfer. For example, the housing 144 of the coupling 136 could define a recess or cavity, which receives the correspondingly shaped inductive power coupling 52 of the mobile nozzle 10, or conversely, the housing 56 of the coupling 52 could define a recess or cavity, which receives the correspondingly shaped inductive power coupling 136 of the niche 130. Additionally, the housing 56 of the coupling 52 could enclose one or more of magnetic or ferrous materials, which can be attracted to one or more corresponding magnetic or ferrous materials enclosed within the housing 144 of the coupling 136, thereby magnetically attracting the couplings 52,136 to each other and providing for a solid and stable inductive power transfer.

As can be seen in FIG. 4A, the couplings 52, 136 allow the mobile nozzle 10 to be removably connected to a power source 140 for charging the battery 48 of the power system 30. The couplings 52, 136 also allow the mobile nozzle 10 to automatically return to the niche 130 and electrically couple itself to the power source 140 and initiate a charging cycle, without requiring a user to make the connection or any other form of intervention. Advantageously, the couplings 52, 136 allow for quick connection and disconnection, and due to their insulated nature, the risk of electric shock is obviated. Moreover, since the couplings 52, 136 have smooth surfaces, they are easy to clean. According to some embodiments of the present disclosure, the niche 130 can also be provided for one or more status indicators (e.g., LEDs or similar lighting devices) that can be positioned so that they are viewable from an exterior of the pool 250 and a user can monitor the status (e.g., operation mode, problem condition, on/off status, charging status, power interruption, etc.) of the niche 130 and/or mobile nozzle 210 without entering the pool 250.

One or more additional niches 130, docking areas, stations, or ports could be provided in the floor 132 or walls (see FIG. 4C) of the pool or spa 50 and could include one or more additional inductive charging couplings 136. For example, one or more inductive charging mats (not shown) could be placed on the floor 132 of the pool or spa 50 and coupled to an external power source (e.g., power source 140) by way of a cord, cable, wire, or the like, thereby providing for inductive charging capabilities where a docking niche is not practical (e.g., an above-ground pool). Accordingly, the mobile nozzle 10 can be configured to automatically travel to and enter the one or more niches 130, or other areas, to periodically recharge the on-board battery 48 of the mobile nozzle 10. In such circumstances, a power cable need not be provided to couple the mobile nozzle 10 to an external power source (e.g., power source 14) during prolonged periods of operation and the mobile nozzle 10 can operate without user intervention for an indefinite period of time.

As shown in FIG. 4A, the niche 130 can be sized so as to minimize the amount of room between the body 12 of the mobile nozzle 10 and the walls 134 of the niche 130, thereby reducing the likelihood that debris, or other foreign material can enter the niche 130. The niche 130 can also be sized such that a top wall 58 of the mobile nozzle 10 is substantially flush, or coplanar, with the floor 132 of the of the pool or spa 50 when the mobile nozzle 10 is docked within the niche 130. Additionally, the top wall 58 of the mobile nozzle 10 can be provided with a recess 60, aperture, or other means for receiving an insert 62 that matches the material and/or visual appearance of the floor 132 of the pool or spa 50. Accordingly, when charging or not in use, e.g., when docked within the niche 130, the mobile nozzle 10 can be obscured from view.

Additionally, the niche 130 can be provided with a suction or return fitting therein and the mobile nozzle 10 can be configured to generate electrical power when water is drawn therethrough. For example, the motor 36 of the mobile nozzle 10 could function as a generator when the mobile nozzle 10 is docked in the niche 130 and water is allowed to flow therethrough and into the return or suction fitting. Accordingly, the mobile nozzle 10 can charge the internal battery 48 without requiring the inductive couplings 56, 136 in the walls 54, 134 or the mobile nozzle 10 and niche 130, respectively.

FIG. 4B is a diagram illustrating the mobile nozzle 10 exiting the niche 130 to begin a cleaning cycle. According to some embodiments of the present disclosure, the mobile nozzle 10 can exit the niche 130 by directing (e.g., by way of nozzle control system 22) the nozzle 32 toward the bottom wall 138 of the niche 13 and expelling a pressurized stream of water 70, thereby propelling the mobile nozzle 10 out of the niche 130. The mobile nozzle 10 could then direct the nozzle 32 to another (e.g., horizontal) orientation, thereby propelling the mobile nozzle 10 away from the niche 130, such that the mobile nozzle 10 is not positioned above the niche 130 and does not reenter same.

As discussed above, the mobile nozzle 10 can also include a buoyancy system 24. The buoyance system 24 can include a reservoir or tank 64 that is in fluid communication with the water conduit 42. The buoyancy system 24 can selectively provide water 68 to the tank 64 by way of a controllable inlet valve 65, and can selectively expel the water 68 from the tank 64 by way of a controllable outlet valve 66. Accordingly, the mobile nozzle 10 can selectively decrease its buoyancy by filling some, or a portion, of the tank 64 with water 68 and can increase its buoyancy by expelling some, or a portion, of the water 68 from the tank 64. For example, as shown in FIG. 4A, the tank 64 of the mobile nozzle 10 can be, at least, partially filled with water 68, thereby decreasing its buoyancy and maintain the position of the mobile nozzle 10 during charging. Conversely, as shown in FIG. 4B, the buoyancy system 24 can, at least, partially expel the water 68 from the tank 64, thereby increasing the buoyancy of the mobile nozzle 10 and allowing the mobile nozzle 10 to more easily exit the niche 130 under the power of the pressurized stream of water 70 expelled from the nozzle 32. Likewise, after the mobile nozzle 10 has moved away from the niche 130, as described above, the buoyancy system 24 can again, at least, partially fill the tank 64 with water, thereby decreasing the buoyancy of the mobile nozzle 10 and allowing the mobile nozzle 10 to sink or return to the pool floor to begin a cleaning operation.

Figure 4C:
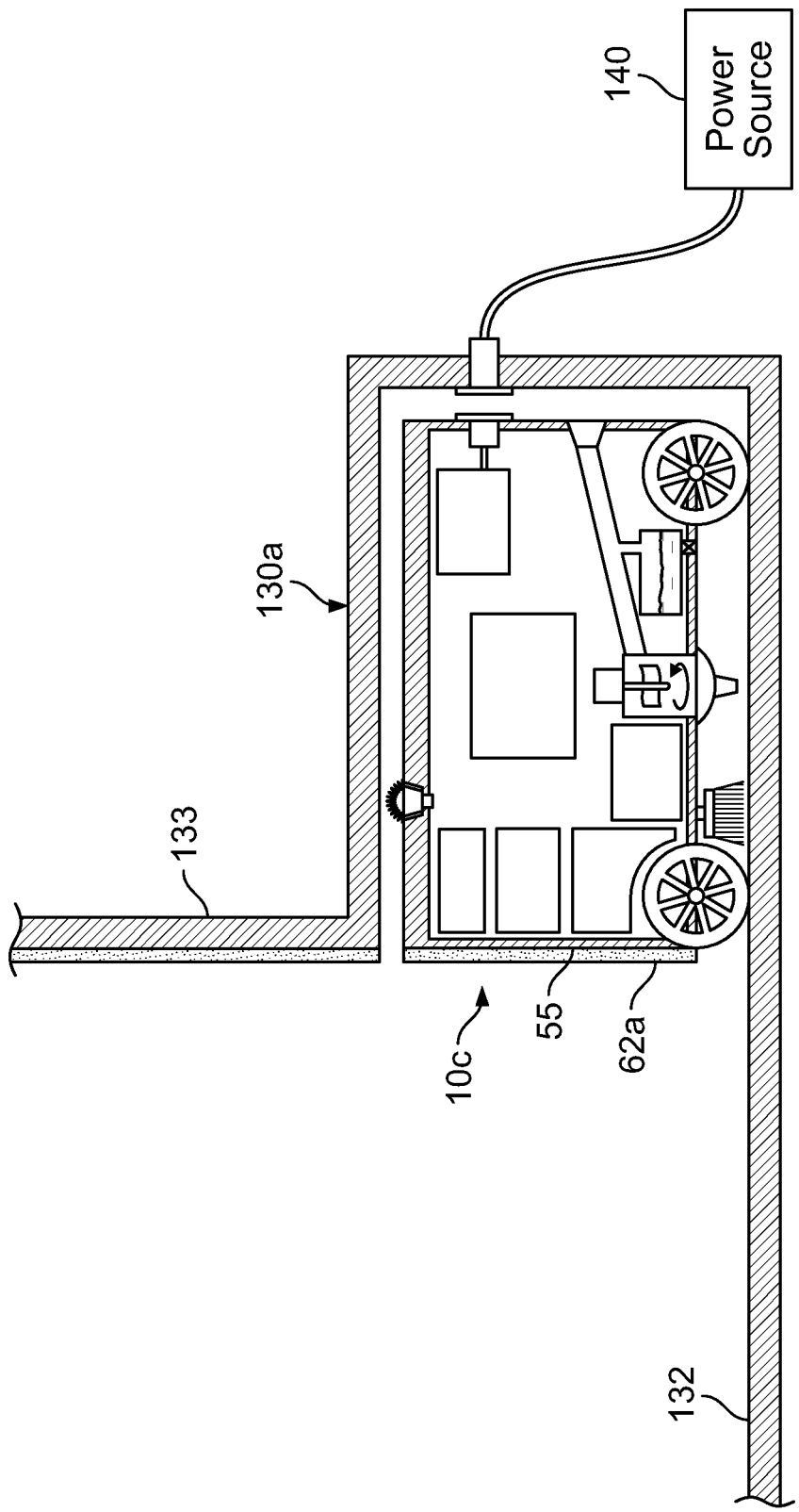
FIG. 4C is a diagram illustrating another mobile nozzle of the present disclosure positioned within a wall niche of a pool or spa.

FIG. 4C is a diagram illustrating a docking niche 130a located in a wall 133 of the pool or spa 50 configured to receive and to provide power to a mobile nozzle 10c. The niche 130a and the mobile nozzle 10c can be substantially similar in construction to the niche 130 and mobile nozzle 10 described in connection with FIGS. 4A and 4B. Accordingly, the niche 130a can also be sized such that a front wall 55 of the mobile nozzle 10c is substantially flush, or coplanar, with the wall 133 of the of the pool or spa 50 when the mobile nozzle 10c is docked within the niche 130a. Additionally, the front wall 55 of the mobile nozzle 10a can be provided with an insert or covering 62a that matches the material and/or visual appearance of the wall 133 of the pool or spa 50. Accordingly, when charging or not in use, e.g., when docked within the niche 130a, the mobile nozzle 10c can be obscured from view.

Figure 5:
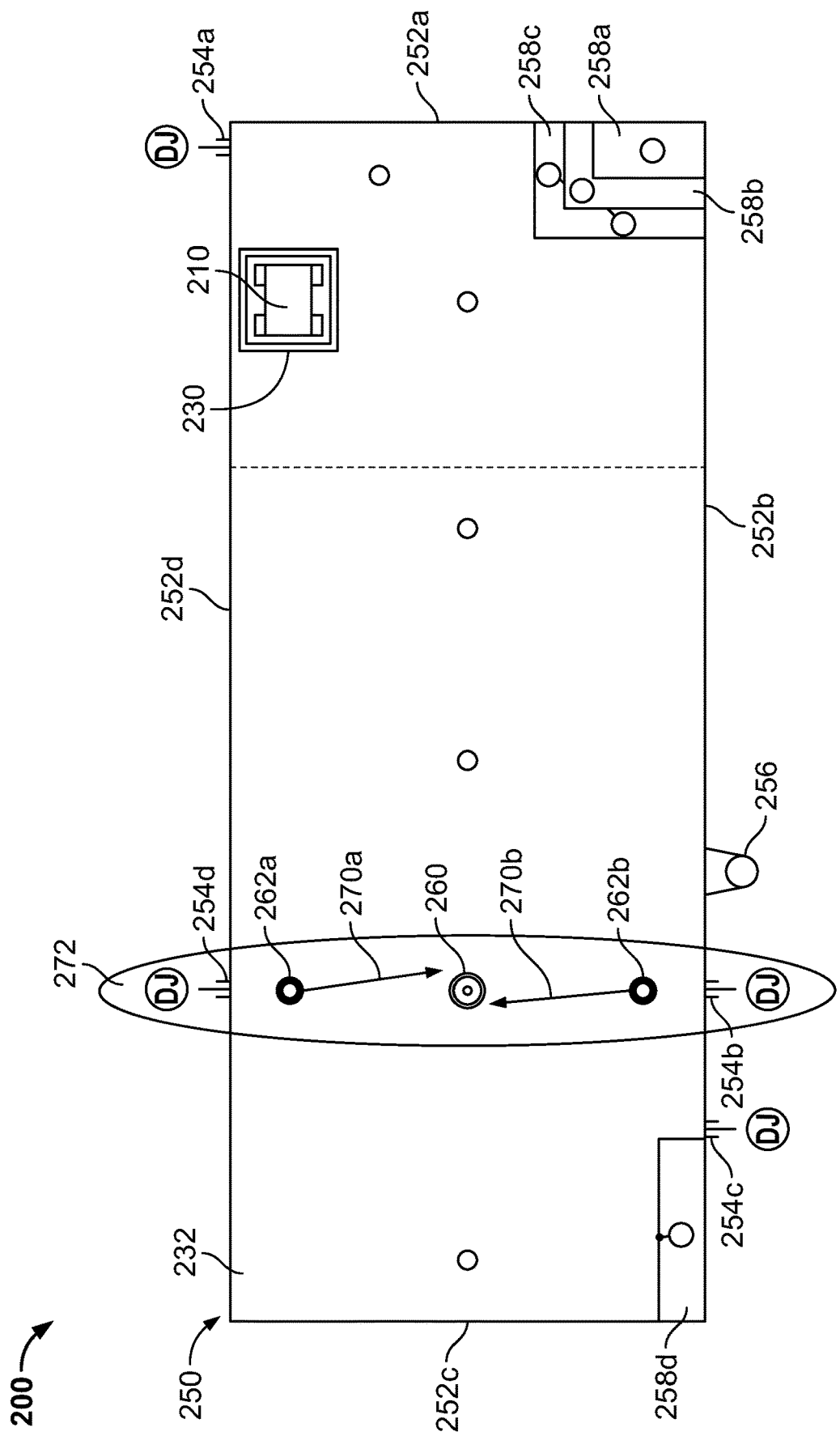
FIG. 5 is a diagram illustrating exemplary features of a pool or spa in connection with the mobile nozzle cleaning system of the present disclosure.

FIG. 5 is a diagram of a mobile nozzle cleaning system 200 of the present disclosure that includes a mobile nozzle 210 and a pool or spa 250 having a niche (or docking station) 230, a floor 232, walls 252a-d, one or more deck jets 254a-d, a skimmer or other filtration device 256, stairs 258a-d, and a primary pool or spa drain or outlet 260. The mobile nozzle 210 can be substantially similar in construction to the mobile nozzle 10 described in connection with FIGS. 1-4B. Accordingly, the mobile nozzle 210 can include one or more of the pump 14, nozzle 32, propulsion system 16, wheels 44a-d, navigation system 18, sensors 20, nozzle control system 22, buoyancy system 24, brush system 25, light sources 26, and communication and control system 28 discussed in connection with the mobile nozzle 10 shown in and described in connection with FIG. 2A.

According to some embodiments of the present disclosure, the pool or spa 250 can also include one or more fixed nozzles 262a, 262b that supplement the mobile nozzle 210 and are configured to emit pressurized streams of water 270a,270b, respectively, toward the primary drain 260. The pool or spa 250 can include a collection zone 272 (e.g., "water curtain"), which is an area that the mobile nozzle 210 is configured to direct debris into. The one or more deck jets 254b, 254d, the primary drain 260, and the fixed nozzles 262a, 262b can be positioned within the collection zone 272, and configured to capture debris that is directed into the collection zone 272 by the mobile nozzle 210 and direct the debris within the collection zone 272 toward the primary drain 260 for extraction from the pool or spa 250.

Figure 6:
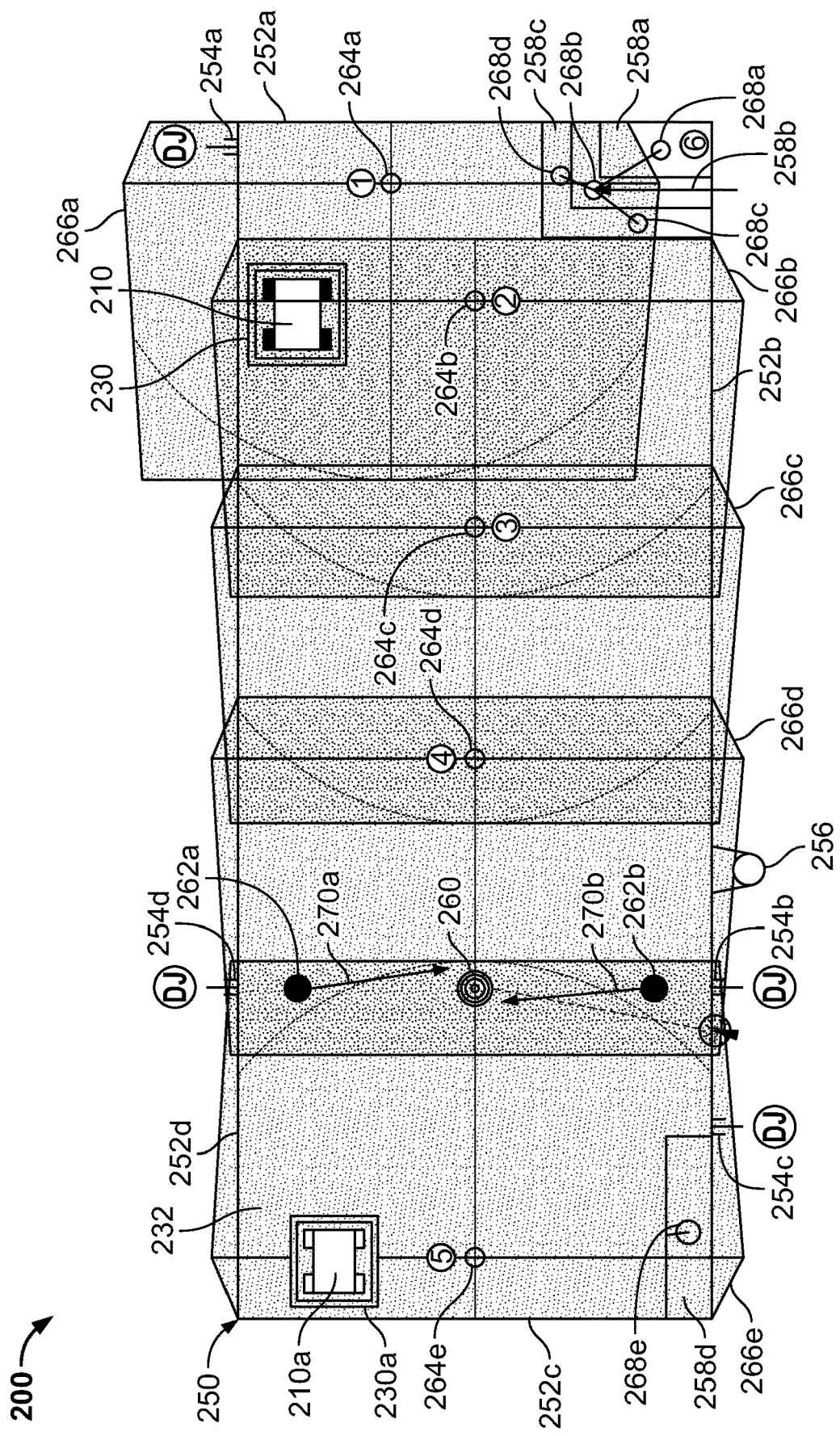
FIG. 6 is a diagram illustrating a cleaning cycle of the mobile nozzle cleaning system for the pool or spa of FIG. 5.

FIG. 6 is a diagram illustrating a directional mobile nozzle cleaning program that can be stored on the memory 88, described in connection with FIG. 3, and executed by the mobile nozzle 210 to operate the mobile nozzle 210 in a first mode of operation. As shown, the cleaning program can cause the mobile nozzle 210 to move to one or more primary positions 264a-d and one or more secondary positions 268a-d within the pool or spa 250. Each of the primary positions 264a-d can be located such that the mobile nozzle 210 can progressively direct or "push" pool or spa debris contained within one or more corresponding and overlapping zones 266a-e toward the main drain 260 and/or collection zone 272. As will be discussed in greater detail herein, the mobile nozzle 210 can discharge a pressurized stream of water 270c (see FIGS. 7A-C) at, and/or between, each of the primary positions 264a-d and secondary positions 268a-d to dislodge the debris and direct it toward the main drain 260 and/or collection zone 272. Additionally, as discussed in connection with FIGS. 7A-C, the mobile nozzle 210 can "sweep" the zones 266a-e with the pressurized stream of water 270c by rotating the nozzle 32, or by rotating its body at each position. The mobile nozzle 210 could also be in communication with one or more pool or spa components (e.g., skimmer 256, a pump, one or more valves, etc.) and/or a pool or spa control system via one or more of the communication protocols discussed in connection with FIG. 3 and the communication and control system 28. Accordingly, the mobile nozzle 210 could be controlled based on information received from the one or more pool or spa components and/or pool or spa control system. For example, the mobile nozzle 210 could be controlled to operate only when the pool or spa pump is operating (e.g., interlocked therewith) and the one or more deck jets 254a-d, the skimmer or other filtration device 256, the primary pool or spa drain or outlet 260, and the nozzles 262a, 262b of the collection zone 272 are operational. Alternatively, the mobile nozzle 210 could be controlled to operate only when the pool or spa pump is operating in a "high-speed" mode, or in a "low-speed" mode. For example, the mobile nozzle 210 can be configured to operate only when the pool or spa pump is in a low-speed mode of operation, where the system 200 includes a venturi powered skimmer 256 and mobile nozzle 210 is used in connection therewith. Of course, it is not necessary that the pool or spa pump be operational for operation of the mobile nozzle 210. According to yet another example, the mobile nozzle 210 can direct debris towards the main drain 260, as discussed herein, or to another location (e.g., in a pile), where it can be collected at a later time. Alternatively, the mobile nozzle 210 can transmit a signal to the pool or spa pump or control system which communicates that debris is ready for collection, or the mobile nozzle 210 can transmit an instruction to the pool or spa pump or control system to activate once the debris is ready for collection.

According to some embodiments of the present disclosure, the cleaning systems described herein (e.g., cleaning system 200 and cleaning system 300, described in connection with FIGS. 8-10C) can include, and the cleaning programs can control, a plurality of mobile nozzles that can cooperate (e.g., work in unison) to remove debris from the pool or spa. For example, as shown in FIG. 6, the cleaning system 200 can include a second niche 230a with a second mobile nozzle 210a located therein. The second mobile nozzle 210a can be substantially similar to the mobile nozzle 210 and, as such, can include a directional mobile nozzle cleaning program that can be stored on a memory (e.g., memory 88, described in connection with FIG. 3), and executed by the mobile nozzle 210a to cause the mobile nozzle 210 to move to the one or more primary positions 264a-d and one or more secondary positions 268a-d within the pool or spa 250. Additionally, the mobile nozzles 210, 210a and their respective cleaning programs can communicate with each another via one or more of the communication protocols described in connection with FIG. 3, such shat the mobile nozzles 210, 210a can cooperate to remove the debris from the pool or spa 250. For example, each of the mobile nozzles 210, 210a could travel to a predefined subset of the one or more primary positions 264a-d and one or more secondary positions 268a-d within the pool or spa 250 so that the mobile nozzles 210, 210a, together, can travel to all of the one or more primary positions 264a-d and one or more secondary positions 268a-d and complete a cleaning operation in a reduced amount of time. Each of the mobile nozzles 210, 210a could also travel to the one or more primary positions 264a-d and one or more secondary positions 268a-d based on proximity thereto, and to each other. For example, the mobile nozzles 210, 210a could be programed to travel to the primary position 264a-d or secondary position 268a-d that it is closest to (e.g., using sensors 20, navigation system 18, and/or navigational beacons described herein). In order to prevent the mobile nozzles 210, 210a from traveling to the same location, or running into each other during operation, the mobile nozzles 210, 210a could also determine the location of the other mobile nozzle. Alternatively, each of the mobile nozzles 210, 210a can determine its own location (e.g., relative to a fixed location or within the pool 250) and communicate said location to the other mobile nozzle 210, 210a. Of course, it should be understood that the cleaning system 200 does not require two or more mobile nozzles (e.g., mobile nozzles 210, 210a) and can function as described herein with only mobile nozzle 210.

FIGS. 7A-C are diagrams of the system 200, illustrating the progression of the mobile nozzle 210 moving to each of the primary positions 264a-e, as directed by the cleaning program. For example, as shown in FIG. 7A, the cleaning program has already been initiated (e.g., according to a cleaning schedule, or manually initiated by a user), the mobile nozzle 210 has exited the niche 230 (e.g., as discussed in connection with FIGS. 4A and 4B), and the mobile nozzle 210 is positioned at the first primary position 264a. Once the mobile nozzle 210 has reached the first primary position 264a, the mobile nozzle can expel a pressurized stream of water 270c in a direction that is generally directed at the drain 260, thereby propelling debris in the path of the stream 270c toward the drain. Additionally, if the pool or spa 25 includes more than one drain 260, the mobile nozzle 210 can identify the closest drain 260 and direct the debris thereto. Alternatively, the mobile nozzle 210 can direct the debris to a predetermined drain 260 based on the location of the mobile nozzle 210 within the pool or spa 250. The stream 270c can be generally parallel to the floor 232 of the pool or spa 250, as shown, for example, in FIGS. 11A and 11B (see stream 470). The communication and control system 28 can cause the mobile device 210 to alter the orientation of the stream 270c in the direction of arrow C, thereby allowing the mobile nozzle 210 to cover a greater area of the zone 266a, without departing from position 264a. For example, the propulsion system 16 of the mobile nozzle 210 could cause the entire body of the mobile nozzle 210 to pivot about position 264a, thereby "sweeping" zone 266a with the pressurized stream 270c. Alternatively, the nozzle control system 22 could cause the movable nozzle 32 of the mobile nozzle 210 to rotate relative to the body of the mobile nozzle 210, in the direction of arrow C, also sweeping zone 266a with the pressurized stream 270c.

FIG. 7B shows the cleaning program after the mobile nozzle 210 has finished cleaning zone 266a, has spent a duration of time at position 264b cleaning zone 266b, and has progressed to position 264c to clean zone 266c. As shown, once the mobile nozzle 210 has reached position 264c, the mobile nozzle 210 can expel the pressurized stream of water 270c in a direction that is generally directed at the drain 260, thereby propelling debris in the path of the stream 270c toward the drain 260. It should be understood that the stream 270c can be disengaged as the mobile nozzle 210 progresses between each of the positions 264a-e (e.g., to conserve battery power), or the stream 270c can remain engaged as the mobile nozzle 210 progresses between each of the positions 264a-e. As similarly described in connection with FIG. 7A, the communication and control system 28 can also cause the mobile device 210 to alter the orientation of the stream 270c in the direction of arrow D, thereby allowing the mobile nozzle 210 to cover a greater area of the zone 266c, without departing from position 264c.

FIG. 7C shows the cleaning program after the mobile nozzle 10 has finished cleaning zones 266a-d, having spent a duration of time at each of positions 264a-d, and has progressed to position 264e to clean zone 266e. As shown, once the mobile nozzle 210 has reached position 264e, the mobile nozzle can expel the pressurized stream of water 270c in a direction that is generally directed at the drain 260, thereby propelling debris in the path of the stream 270c toward the drain 260. As similarly described in connection with FIGS. 7A and 7B, the system 200 can also cause the mobile device 210 to alter the orientation of the stream 270c in the direction of arrow E, thereby allowing the mobile nozzle 210 to cover a greater area of the zone 266c without departing from position 264c.

Once the mobile nozzle 210 has progressed through all of the primary positions 264a-e and has cleaned zones 266a-e, the cleaning program can direct the mobile nozzle 210 to one or more of the secondary positions 268a-d (see FIG. 6), following a similar procedure and steps as those described in connection with FIGS. 7A-C. According to some aspects of the present disclosure, the secondary positions 268a-e can correspond to features of the pool or spa 250 that are not flush with the floor 232 of the pool or spa 250. For example, as shown best in FIG. 6, the secondary positions 268a-e can correspond to steps 258a-d of the pool or spa 250 and each of the steps 258a-d can have a different height. Accordingly, the mobile nozzle 210 can be provided with means for altering the height thereof in order to reach one or more positions that are not flush with the floor 232 and/or to enable the mobile nozzle 210 to traverse a greater number of areas of the pool or spa 250. It is noted that the mobile nozzle 210 can be dimensioned such that it can rest on a step 258a-d and move along the length of the step 258a-d. It should also be understood that the mobile nozzle 210 can clean the secondary positions 268a-e prior to the primary positions 264a-e, or the mobile nozzle 210 can alternate therebetween, depending on the configuration of a particular pool and the determined optimal cleaning pattern.

As discussed above, the mobile nozzle 210 can be substantially similar to the mobile nozzle 10, discussed in connection with FIGS. 2-4C, and as such can include similar movable nozzle 32 and buoyancy systems 24. Accordingly, the mobile nozzle 210 can traverse the floor 232 of the pool or spa 258 until it encounters a feature (e.g., step 258d) that is not flush with the floor 232 at which point the mobile nozzle 210 can cause its nozzle 32 to move to a substantially vertical orientation and can expel the pressurized stream 270c towards the floor 232 of the pool or spa 250, thereby propelling the mobile nozzle 210 in an opposite and upward direction. At the same time, the mobile nozzle 210 can also increase its buoyancy by expelling an amount of water from the buoyancy system 24, as described in connection with FIGS. 4A and 4B. Once the mobile nozzle 210 has reached, or exceeded, the height of the feature, the mobile nozzle 210 can cause its nozzle 32 to move to a second orientation so as to expel the pressurized stream 270c in a direction generally opposite to the direction of the feature, thereby propelling the mobile nozzle 210 toward the feature. The mobile nozzle 210 can then decrease its buoyancy by filling at least a portion of the buoyancy system 24 with water, until the mobile nozzle 210 is able to settle on the feature (e.g., at the secondary position 268e). The mobile nozzle 210 can then remove debris from the feature by discharging the pressurized stream 270c to direct the debris toward the drain 260, or by a using the pressurized stream 270c to agitate the debris, e.g., by directing the stream 270c in a direction normal to the feature, thereby dispersing the debris as discussed in connection with FIGS. 8-10C.

FIG. 8 is a diagram illustrating another mobile nozzle cleaning system 300 (e.g., an agitation system) that includes a mobile nozzle 310 and another pool or spa 350 having a niche 330, a floor 332, a plurality of walls 352, a skimmer or other filtration device 356, stairs 358a-e, a primary pool or spa drain or outlet 360, and a secondary suction outlet 334.

Figure 9:
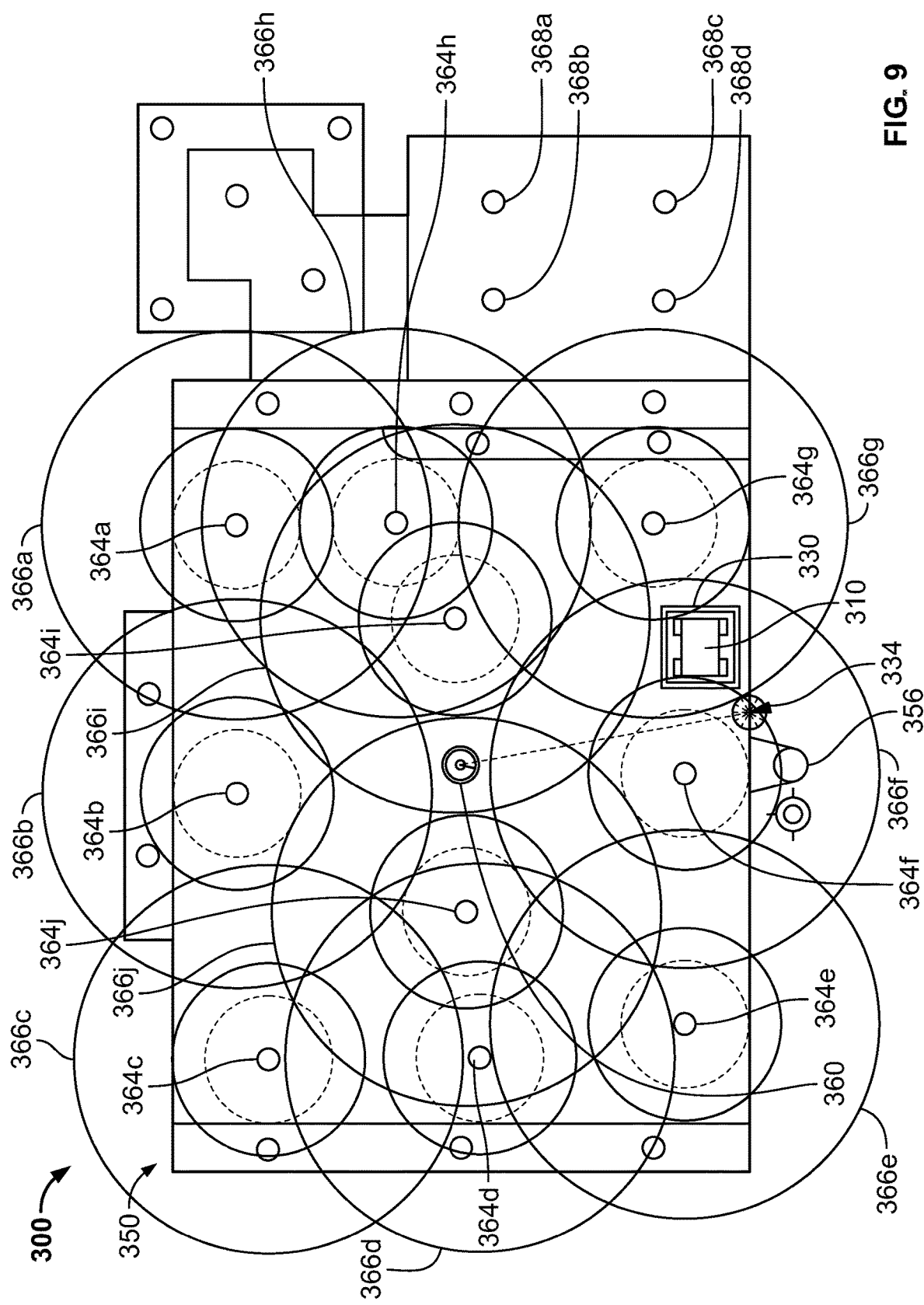
FIG. 9 is a diagram illustrating a cleaning cycle of the mobile nozzle cleaning system for the pool or spa of FIG. 8.

FIG. 9 is a diagram illustrating another mobile nozzle cleaning program, which can be executed by the mobile nozzle cleaning system 300 to operate in a second mode of operation, e.g., an agitation mode of operation. The agitation mode of operation can include a series of overlapping positions to which the mobile nozzle 310 travels and directs a pressurized stream of water against a pool or spa 350 floor, thereby causing debris that has settled on the pool or spa 350 floor to be dislodged/agitated and suspended in the pool or spa 350. The debris can then be removed through normal water turnover operations, such as through a main drain 360 or through one or more skimmers 334. The mobile nozzle 310 moves to each of the series of positions and agitates the debris and continues to repeat the series, maintaining the debris in suspension until all of the debris is removed from the pool or spa 350.

As shown in FIG. 9, the cleaning program can direct the mobile nozzle 310 to one or more primary positions 364a-j and one or more secondary positions 368a-d within the pool or spa 350. Each of the primary positions 364a-j can be located such that the mobile nozzle 310 can "agitate" pool or spa debris that has settled on the floor 332 within one or more corresponding and overlapping zones 366a-j, such that the debris can be dislodged from the floor 332 and removed from the pool or spa 350 by way of the drain 360, the skimmer 310, or one or more secondary suction outlets 334. The mobile nozzle 310 could also be in communication with one or more pool or spa components (e.g., skimmer 356, a pump, one or more valves, etc.) and/or a pool or spa control system via one or more of the communication protocols discussed in connection with FIG. 3 and the communication and control system 28. Accordingly, the mobile nozzle 310 could be controlled based on information received from the one or more pool or spa components and/or pool or spa control system. For example, the mobile nozzle 310 could be controlled to operate only when the pool or spa pump is operating (e.g., interlocked therewith) and one or more deck jets and the skimmer or other filtration device 356 are operational. Alternatively, the mobile nozzle 310 could be controlled to operate only when the pool or spa pump is operating in a "high-speed" mode, or in a "low-speed" mode. Of course, it is not necessary that the pool or spa pump be operational for operation of the mobile nozzle 310. For example, the mobile nozzle 310 can continuously agitate debris until it can be collected at a later time (e.g., when the skimmer 356 is operational). Alternatively, the mobile nozzle 310 can transmit a signal to the pool or spa pump or control system which communicates that debris is ready for collection, or the mobile nozzle 310 can transmit an instruction to the pool or spa pump or control system to activate once the debris is ready for collection. According to another example, the mobile nozzle 310 can be configured to operate only when the pool or spa pump is in a low-speed mode of operation, where the system 300 includes a venturi powered skimmer 356 and mobile nozzle 310 is used in connection therewith.

As described in greater detail in connection with cleaning system 200 and corresponding FIGS. 5-7C, cleaning system 300 can include, and the cleaning programs can control, a plurality of mobile nozzles 310 that can cooperate (e.g., work in unison) to remove debris from the pool or spa 350. Of course, it should be understood that the cleaning system 300 does not require two or more mobile nozzles 310 and can function as described herein with a single mobile nozzle 310.

FIGS. 10A-C are diagrams of the system 300, illustrating the progression of the mobile nozzle 310 moving to each of the primary positions 364a-j when in the second mode of operation, as directed by the cleaning program. For example, as shown in FIG. 10A, the cleaning program has already been initiated (e.g., according to a cleaning schedule, or manually initiated by a user), and the mobile nozzle has exited the niche 330 (e.g., as discussed in connection with FIGS. 4A and 4B) and is positioned at the first primary position 364a. Once the mobile nozzle 310 has reached position 264a, the mobile nozzle 310 can expel a pressurized stream of water 370c (not shown) in a direction that is generally directed at the floor 332 of the pool or spa 350, thereby "agitating" the debris and propelling the debris radially away from the position 364a, such that the debris can float to the water surface of the pool or spa 50 where it can be captured by the one or more skimmers 356. Of course, a portion of the dislodged debris could also be captured by the drain 360 and the one or more secondary suction outlets 334. The pressurized stream 370c can also be directed at the floor 332 at an angle that is less than perpendicular, while still being able to agitate the debris of the pool or spa 350 in the manner described in connection with FIGS. 10A-C. However, it should be understood that the angle of the pressurized stream 370c with respect to the floor 332 when used to "agitate" the debris is generally greater than, for example, the angle of the pressurized stream 270c described in connection with FIGS. 6A-C, for "directing" the debris toward the main drain 260. FIG. 10B shows the cleaning program after the mobile nozzle 10 has finished cleaning zone 366a, has spent a duration of time at positions 364b and 364c and cleaned zones 366b and 366c, and has progressed to position 364d to clean zone 366d. As shown, once the mobile nozzle 310 has reached position 364d, the mobile nozzle 310 can expel a pressurized stream of water (not shown) in a direction that is generally directed at the floor 332 of the pool or spa 350, thereby "agitating" the debris and propelling the debris radially away from the position 364d such that the debris can float to the water surface of the pool or spa 50. It should be understood that the stream 370c can be disengaged as the mobile nozzle 310 progresses between each of the positions 364a-j (e.g., to conserve battery power), or the stream 370c can remain engaged as the mobile nozzle 310 progresses between each of the positions 264a-J.

FIG. 10C shows the cleaning program after the mobile nozzle 310 has finished cleaning zones 366a-e, having spent a duration of time at each of positions 364a-e, and has progressed to position 364f to clean zone 366f. As shown, once the mobile nozzle 310 has reached position 364f, the mobile nozzle can expel a pressurized stream of water (not shown) in a direction that is generally directed at the floor 332 of the pool or spa 350, thereby "agitating" the debris and propelling the debris radially away from the position 364f such that the debris can float to the water surface of the pool or spa 50.

Once the mobile nozzle has progressed through all of the primary positions 364a-j and has cleaned zones 366a-j, the cleaning program can direct the mobile nozzle 310 to one or more of the secondary positions 368a-d, following a similar procedure and steps as those described in connection with FIGS. 7A-C. According to some aspects of the present disclosure, the secondary positions 368a-d can correspond to features of the pool or spa 350 that are not flush with the floor 332 of the pool or spa 350. Accordingly, the mobile nozzle 310 can be provided with means for altering the height thereof in order to reach one or more positions that are not flush with the floor 332 and/or to enable the mobile nozzle 310 to traverse a greater number of areas of the pool or spa 350.

It should be understood that the mobile nozzle 310 can be substantially similar to the mobile nozzle 10, discussed in connection with FIGS. 2-4C, and as such can include similar movable nozzle 32 and buoyancy systems 24. Accordingly, the mobile nozzle 310 can traverse the floor 332 of the pool or spa 358 until it encounters a feature that is not flush with the floor 332 and can adjust its height to traverse said feature, as similarly described in connection with FIGS. 7A-C.

According to some embodiments of the present disclosure, the mobile nozzle cleaning systems 200, 300 can include one or more beacons (e.g., RFID, magnetic, sonic, optical, etc.) positioned permanently or semi-permanently at one or more of the primary and/or secondary positions 264a-e, 268a-e, 364a-j, 368a-d in order to guide the mobile nozzles 410 to the positions 264a-e, 268a-e, 364a-j, 368a-d. Additionally or alternatively, the main drains 260, 360 or niches 130 can contain a beacon to provide a fixed reference coordinate and one or more pool or spa features (e.g., primary and/or secondary positions 264a-e, 268a-e, 364a-j, 368a-d, drains 260, 360, skimmers 256, 356, etc.) can be mapped based on their location relative to the beacon. The mobile nozzle niches 130, 230, 330 disclosed herein can also be provided with a home beacon that emits a home signal, allowing the mobile nozzles 10, 210, 310, 410 to locate and return to the niches 130, 230, 330 from anywhere in the pool 50, 250, 350, 450. Accordingly, the mobile nozzles 10, 210, 310, 410 disclosed herein can be provided with one or more sensors 20 for locating the beacons and communicating this information to the navigation system 18 of the mobile nozzles 10, 210, 310, 410. Further still, the mobile nozzles 10, 210, 310, 410 of the present disclosure can be programmed to travel to pre-determined locations based on a pre-programmed map of the pool or spa 50, 250, 350, 450, the mobile nozzles 10, 210, 310, 410 can be provided with proximity, optical, or other sensors 20 enabling the mobile nozzles 10, 210, 310, 410 to generate a map of the pool or spa 50, 250, 350, 450 (e.g., the mobile nozzles 10, 210, 310, 410 can self-learn the shape of the pool or spa). Alternatively, the map/layout of the pool or spa can be programmed on-site by an owner or installation technician.

According to further embodiments of the present disclosure, the mobile nozzles 10, 210, 310, 410 can include one or more sensors (e.g., optical, proximity, etc.), vision systems, or other means for detecting debris as the mobile nozzles 10, 210, 310, 410 traverse the pool or spa 50, 250, 350, 450. For example, the cleaning programs of the mobile nozzle cleaning systems disclosed herein could be configured to detect debris as the mobile nozzles 10, 210, 310, 410 traverse primary and/or secondary positions (e.g., 264a-e, 268a-e, 364a-j, 368a-d) and the cleaning programs could include a mode of operation whereby the mobile nozzles 10, 210, 310, 410 reposition themselves upon detecting debris to either direct the debris toward a main drain or agitate the debris for collection by a skimmer. The cleaning programs could also include a mode of operation whereby the mobile nozzles 10, 210, 310, 410 can identify one or more areas having debris and return to same areas after traversing the primary and/or secondary positions (e.g., 264a-e, 268a-e, 364a-j, 368a-d). The mobile nozzles 10, 210, 310, 410 could also include another mode of operation, whereby the mobile nozzles 10, 210, 310, 410 first traverse the pool or spa 50, 250, 350, 450 with the brush systems 25, 225, 325, 425 engaged, to loosen debris, and can then traverse the pool or spa 50, 250, 350, 450 with the nozzles 32, 232, 332, 432 engaged, so as to direct the debris toward a main drain or agitate the debris for collection by a skimmer.

FIGS. 11A and 11B are block diagrams illustrating another exemplary mobile nozzle 410 of the present disclosure, including means 472 for securing the mobile nozzle 410. For example, the means 472 can adjust the position of wheels 444a-d of the mobile nozzle 410 so that one or more rigid protrusions of the mobile nozzle 410 engages and rests on the pool floor 476. The mobile nozzle 410 can be substantially similar in both form and function to the mobile nozzles 10, 210, 310 discussed in connection with FIGS. 1-10C except for distinctions noted herein, and can be used in connection with systems 200 and 300 of the present disclosure.

Accordingly, the mobile nozzle 410 can include a watertight body 412 that is adapted for submersion in the pool or spa 450 and houses one or more of a pump 414, a nozzle 432, a propulsion system 416, wheels 444a-d, a navigation system 418, one or more sensors 420, a nozzle control system 422, a buoyancy system 424, a brush system 425, one or more light sources 426, and a communication and control system 428 and a rechargeable power system 430 for providing electrical power to the foregoing systems, among other components. Additionally, as referenced above, the mobile nozzle 410 can include means 472a-d for securing the mobile nozzle 410, which can adjust the position of the wheels 444a-d relative to the body 412 and can include one or more rigid protrusions 474 positioned on a bottom wall 434 of the body 412 adjacent to the floor 476 of the pool or spa 450. According to some embodiments of the present disclosure, means 472a-d can include one or more hydraulic cylinders, pneumatic cylinders, gearing systems, etc., coupled to the wheels 444a-d and associated systems for enabling retraction thereof, which can be in communication with one or more of the control systems of the mobile nozzle 410 disclosed herein.

As shown in FIGS. 11A and 11B, the pressurized stream of water 470 can be expelled from the nozzle 432 in a direction that is generally horizontal and substantially parallel with the floor 476 of the pool or spa 450. As will be understood by those of ordinary skill in the art, this arrangement causes a force, shown as arrow F, to be applied to the mobile nozzle 410 in a direction that is opposite to the trajectory of the pressurized stream 470, which can cause the mobile nozzle 410 to move in the direction of arrow F and drift to another portion of the pool or spa 450 if, for example, rotation of the wheels 444a-d is not inhibited or movement of the mobile nozzle 410 is not otherwise prevented.

The mobile nozzle 410 addresses this problem by disengaging the wheels 444a-d from the floor 476 of the pool or spa 450 and allowing the mobile device to "sit" on the floor 476 of the pool or spa 450. More specifically, means 472a-d coupled to the wheels 444a-d of the mobile nozzle 410 can move the wheels 444a-d from a first deployed position, shown in FIG. 11A, where the wheels 444a-d contact the floor 476 to a second retracted position, shown in FIG. 11B, where the wheels are raised, such that the protrusions 474a-d come to rest on the floor 476, thereby preventing the mobile nozzle 410 from moving when the nozzle 432 is operated in a substantially horizontal orientation.

FIG. 11C is a block diagram illustrating the mobile nozzle 410a including another means 480 for securing the mobile nozzle 410. The means 480 for securing the mobile nozzle 410 can supplement, or replace, the means 472 for securing the mobile nozzle 410, described above in connection with FIGS. 11A and 11B. As shown, the means 480 includes a latch 482 that can be removably coupled to an anchor 484 affixed to the floor 476 of the pool or spa 450. The latch 482 can be controlled by, or in communication with, one or more of the control systems, e.g., the communication and control system 27 shown and described in connection with FIG. 2A and mobile nozzle 10, of the mobile nozzle 410 disclosed herein, such that the mobile nozzle 410 can selectively couple the latch 482 to the anchor 484. According to embodiments of the present disclosure, the means 480 can comprise a latch 482 configured as a hook (e.g., as shown in FIG. 11C), a magnetic latch, or a suction-driven latch and can further include reciprocal anchors 484, e.g., a loop for the hook to engage, an oppositely charged magnetic latch, a ferromagnetic latch, etc. According to still further embodiments of the present disclosure, the anchor 484 can include a beacon (e.g., RFID, magnetic, sonic, optical, etc.) and the anchor 484 can be positioned permanently or semi-permanently at one or more of the primary and/or secondary positions 264*a-e*, 268*a-e*, 364*a-j*, 368*a-d* in order to guide the mobile nozzle 410 to the positions 264*a-e*, 268*a-e*, 364*a-j*, 368*a-d*.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A mobile nozzle for expelling pressurized water toward a debris collection zone displaced from the mobile nozzle, the mobile nozzle comprising:
    a body;
    a water intake configured to receive water;
    a discharge nozzle in fluidic communication with the water intake, the discharge nozzle configured to expel pressurized water; and
    a computer system including a memory and a processor, the processor operable to:
        identify the debris collection zone;
        cause the mobile nozzle to move to a first location in a pool or spa; and
        cause pressurized water to be expelled through the discharge nozzle toward the debris collection zone to cause debris to move away from the mobile nozzle and toward the debris collection zone when the mobile nozzle is positioned at the first location.

2. The mobile nozzle of claim 1, wherein the processor is further operable to:
    cause the mobile nozzle to move to a second location in the pool or spa; and
    cause pressurized water to be expelled through the discharge nozzle toward the debris collection zone to cause debris to move away from the mobile nozzle and toward the debris collection zone when the mobile nozzle is positioned at the second location.

3. The mobile nozzle of claim 2, wherein the processor is operable to:
    communicate with a first beacon positioned at the first location;
    locate a position of the first beacon based on the communication with the first beacon;
    communicate with a second beacon positioned at the second location; and
    locate a position of the second beacon based on the communication with the second beacon.

4. The mobile nozzle of claim 3 in combination with the first beacon and the second beacon.

5. The mobile nozzle of claim 1, wherein the processor is operable to communicate with a beacon positioned at the debris collection zone, and locate the debris collection zone based on the communication with the beacon.

6. The mobile nozzle of claim 5 in combination with the beacon.

7. The mobile nozzle of claim 1, wherein the discharge nozzle is adjustable.

8. The mobile nozzle of claim 1, wherein the discharge nozzle is rotatable in a sweeping motion.

9. The mobile nozzle of claim 1, wherein the mobile nozzle is configured to rotate about a pivot point to cause the discharge nozzle to move in a sweeping motion.

10. The mobile nozzle of claim 1, comprising a plurality of wheels.

11. The mobile nozzle of claim 1, wherein the mobile nozzle is configured to be housed within a niche located in one or more of a wall and a floor of the pool or spa, and the mobile nozzle includes a rechargeable battery.

12. The mobile nozzle of claim 1, comprising a pump in fluidic communication with the water intake and the discharge nozzle, the pump configured to draw water in through the water intake and expel the water out from the discharge nozzle.

13. The mobile nozzle of claim 12, wherein the pump is reversible and configured to draw water in through the discharge nozzle and expel the water out from the water intake.

14. The mobile nozzle of claim 1, wherein the processor is further operable to automatically determine an optimal position for the first location in the pool or spa.

15. The mobile nozzle of claim 1, wherein the processor is operable to identify a location of the debris collection zone based on user input.

16. The mobile nozzle of claim 1, wherein the processor is further operable to receive a user defined map of the pool or spa, the user defined map including a position of the debris collection zone and a position of the first location.

17. The mobile nozzle of claim 1, wherein the processor is configured to receive an indication that a pump in fluidic communication with the debris collection zone is operational, and cause the pressurized water to be expelled through the discharge nozzle based on the indication.

18. A method of collecting debris in a debris collection zone using a mobile nozzle, comprising:
    identifying the debris collection zone;
    causing the mobile nozzle to move to a first location in a pool or spa, the mobile nozzle comprising a body, a water intake configured to receive water, a discharge nozzle in fluidic communication with the water intake and configured to expel pressurized water, and a computer system including a memory and a processor; and
    expelling pressurized water through the discharge nozzle of the mobile nozzle toward the debris collection zone to cause debris to move away from the mobile nozzle and toward the debris collection zone when the mobile nozzle is positioned at the first location.

19. The method of claim 18, further comprising:
    causing the mobile nozzle to move to a second location in the pool or spa; and
    expelling pressurized water through the discharge nozzle toward the debris collection zone to cause debris to move away from the mobile nozzle and toward the debris collection zone when the mobile nozzle is positioned at the second location.

20. The method of claim 19, further comprising:
communicating with a first beacon positioned at the first location;
locating a position of the first beacon based on the communication with the first beacon;
communicating with a second beacon positioned at the second location; and
locating a position of the second beacon based on the communication with the second beacon.

21. The method of claim 18, wherein identifying the debris collection zone comprises:
communicating with a beacon positioned at the debris collection zone; and
locating the debris collection zone based on the communication with the beacon.

22. The method of claim 21, wherein identifying the debris collection zone is performed by the processor of the mobile nozzle.

23. The method of claim 18, wherein the discharge nozzle is adjustable.

24. The method of claim 18, further comprising:
rotating the discharge nozzle in a sweeping motion while expelling the pressurized water through the discharge nozzle.

25. The method of claim 18, further comprising:
rotating the mobile nozzle about a pivot point to cause the discharge nozzle to move in a sweeping motion while expelling the pressurized water through the discharge nozzle.

26. The method of claim 18, wherein the mobile nozzle comprises a plurality of wheels.

27. The method of claim 18, further comprising:
positioning the mobile nozzle within a niche located in one or more of a wall and a floor of the pool or spa.

28. The method of claim 27, further comprising recharging a rechargeable battery of the mobile nozzle.

29. The method of claim 18, wherein the mobile nozzle comprises a pump in fluidic communication with the water intake and the discharge nozzle, the pump configured to draw water in through the water intake and expel the water out from the discharge nozzle.

30. The method of claim 29, wherein the pump is reversible and configured to draw water in through the discharge nozzle and expel the water out from the water intake.

31. The method of claim 18, further comprising:
determining, by the processor, an optimal position for the first location in the pool or spa.

32. The method of claim 18, wherein identifying the debris collection zone is performed based on user input.

33. The method of claim 18, further comprising:
receiving a user defined map of the pool or spa including a position of the debris collection zone and a position of the first location.

34. The method of claim 18, further comprising receiving an indication that a pump in fluidic communication with the debris collection zone is operational,
wherein expelling of the pressurized water through the discharge nozzle of the mobile nozzle is performed based on the indication received.

35. A mobile nozzle for agitating debris in a pool or a spa, the mobile nozzle comprising:
a body;
a water intake configured to receive water;
a discharge nozzle in fluidic communication with the water intake, the discharge nozzle configured to expel pressurized water; and
a computer system including a memory and a processor, the processor operable to:
identify a first agitation location in the pool or the spa;
cause the mobile nozzle to move to the first agitation location;
expel pressurized water through the discharge nozzle toward a surface of the pool or spa to agitate debris at the first agitation location and cause the agitated debris to be suspended in water of the pool or spa and moved away from the mobile nozzle;
identify a second agitation location in the pool or the spa;
cause the mobile nozzle to move to the second agitation location; and
expel pressurized water through the discharge nozzle toward a surface of the pool or spa to agitate debris at the second agitation location and cause the agitated debris to be suspended in the water of the pool or spa and moved away from the mobile nozzle.

36. The mobile nozzle of claim 35, wherein the processor is further operable to:
cause the mobile nozzle to move in a navigation pattern, the navigation pattern including the first agitation location and the second agitation location.

37. The mobile nozzle of claim 35, wherein the processor is further operable to:
communicate with a first beacon positioned at the first location;
locate a position of the first beacon based on the communication with the first beacon;
communicate with a second beacon positioned at the second location; and
locate a position of the second beacon based on the communication with the second beacon.

38. The mobile nozzle of claim 37 in combination with the first beacon and the second beacon.

39. The mobile nozzle of claim 35, wherein the discharge nozzle is adjustable.

40. The mobile nozzle of claim 35, wherein the discharge nozzle is rotatable in a sweeping motion.

41. The mobile nozzle of claim 35, wherein the mobile nozzle is configured to rotate about a pivot point to cause the discharge nozzle to move in a sweeping motion.

42. The mobile nozzle of claim 41, wherein the mobile nozzle is configured to rotate 360 degrees.

43. The mobile nozzle of claim 35, comprising a plurality of wheels.

44. The mobile nozzle of claim 35, wherein the mobile nozzle is configured to be housed within a niche located in one or more of a wall and a floor of the pool or spa, and the mobile nozzle includes a rechargeable battery.

45. The mobile nozzle of claim 35, comprising a pump in fluidic communication with the water intake and the discharge nozzle, the pump configured to draw water in through the water intake and expel the water out from the discharge nozzle.

46. The mobile nozzle of claim 45, wherein the pump is reversible and configured to draw water in through the discharge nozzle and expel the water out from the water intake.

47. The mobile nozzle of claim 35, wherein the processor is further operable to automatically determine an optimal position for the first agitation location and the second agitation location in the pool or spa.

48. The mobile nozzle of claim 35, wherein the processor is further operable to receive a user defined map of the pool or spa, the user defined map including a position of the first agitation location and a position of the second agitation location.

49. The mobile nozzle of claim 35, wherein the processor is configured to receive an indication that a pump in fluidic communication with a pool skimmer or spa skimmer is operational, and cause the pressurized water to be expelled through the discharge nozzle based on the indication.

50. A method of agitating debris in a pool or spa using a mobile nozzle, comprising:
identifying a first agitation location in the pool or spa;
causing the mobile nozzle to move to the first agitation location, the mobile nozzle comprising a body, a water intake configured to receive water, a discharge nozzle in fluidic communication with the water intake and configured to expel pressurized water, and a computer system including a memory and a processor;
expelling pressurized water through the discharge nozzle of the mobile nozzle toward a surface of the pool or spa to agitate debris at the first agitation location and cause the agitated debris to be suspended in water of the pool or spa and moved away from the mobile nozzle;
identifying a second agitation location in the pool or spa;
causing the mobile nozzle to move to the second agitation location; and
expelling pressurized water through the discharge nozzle of the mobile nozzle toward a surface of the pool or spa to agitate debris at the second agitation location and cause the agitated debris to be suspended in the water of the pool or spa and moved away from the mobile nozzle.

51. The method of claim 50, wherein the first agitation location and the second agitation location are a portion of a navigation pattern.

52. The method of claim 50, further comprising:
communicating with a first beacon positioned at the first agitation location;
locating a position of the first beacon based on the communication with the first beacon;
communicating with a second beacon positioned at the second agitation location; and
locating a position of the second beacon based on the communication with the second beacon.

53. The method of claim 50, wherein the discharge nozzle is adjustable.

54. The method of claim 50, further comprising:
rotating the discharge nozzle in a sweeping motion while expelling the pressurized water through the discharge nozzle.

55. The method of claim 50, further comprising:
rotating the mobile nozzle about a pivot point to cause the discharge nozzle to move in a sweeping motion while expelling the pressurized water through the discharge nozzle.

56. The method of claim 55, wherein the mobile nozzle is rotated 360 degrees.

57. The method of claim 50, wherein the mobile nozzle comprises a plurality of wheels.

58. The method of claim 50, further comprising:
positioning the mobile nozzle within a niche located in one or more of a wall and a floor of the pool or spa.

59. The method of claim 58, further comprising recharging a rechargeable battery of the mobile nozzle.

60. The method of claim 50, wherein the mobile nozzle comprises a pump in fluidic communication with the water intake and the discharge nozzle, the pump configured to draw water in through the water intake and expel the water out from the discharge nozzle.

61. The method of claim 60, wherein the pump is reversible and configured to draw water in through the discharge nozzle and expel the water out from the water intake.

62. The method of claim 50, further comprising:
determining, by the processor, an optimal position for the first agitation location and the second agitation location in the pool or spa.

63. The method of claim 50, wherein identifying the first agitation location and identifying the second agitation location are performed based on user input.

64. The method of claim 50, further comprising:
receiving a user defined map of the pool or spa including a position of the first agitation location and a position of the second agitation location.

65. The method of claim 50, further comprising receiving an indication that a pump in fluidic communication with a pool skimmer or spa skimmer is operational,
wherein expelling of the pressurized water through the discharge nozzle of the mobile nozzle is performed based on the indication received.

* * * * *